(12) United States Patent
Moon et al.

(10) Patent No.: US 12,349,681 B2
(45) Date of Patent: Jul. 8, 2025

(54) COMPOSITIONS, SYSTEMS, AND METHODS FOR INCREASED PLANT QUALITY

(71) Applicant: RDX-N, LLC, Burley, ID (US)

(72) Inventors: Darin Moon, Burley, ID (US); Kody Moon, Burley, ID (US)

(73) Assignee: RDX-N, LLC, Burley, ID (US)

( * ) Notice: Subject to any disclaimer, the term of this patent is extended or adjusted under 35 U.S.C. 154(b) by 0 days.

(21) Appl. No.: 18/483,463

(22) Filed: Oct. 9, 2023

(65) Prior Publication Data

US 2024/0122187 A1 Apr. 18, 2024

Related U.S. Application Data

(60) Provisional application No. 63/415,867, filed on Oct. 13, 2022.

(51) Int. Cl.
| | | |
|---|---|---|
| *A61K 36/52* | (2006.01) | |
| *A01N 31/02* | (2006.01) | |
| *A01N 59/04* | (2006.01) | |
| *A01N 65/00* | (2009.01) | |
| *A01N 65/08* | (2009.01) | |
| *A01P 21/00* | (2006.01) | |

(52) U.S. Cl.
CPC .............. *A01N 65/08* (2013.01); *A01N 31/02* (2013.01); *A01N 59/04* (2013.01); *A01P 21/00* (2021.08)

(58) Field of Classification Search
CPC ........ A01N 35/06; A01N 65/08; C05C 11/00; A61K 36/52
See application file for complete search history.

(56) References Cited

U.S. PATENT DOCUMENTS

| | | | |
|---|---|---|---|
| 2005/0119127 A1 | 6/2005 | Cambri et al. | |
| 2007/0264369 A1* | 11/2007 | Moon .................... | A01N 65/08 424/771 |
| 2008/0307843 A1 | 12/2008 | Subbarao et al. | |
| 2011/0165278 A1 | 7/2011 | Moon | |
| 2012/0322889 A1 | 12/2012 | Stich et al. | |
| 2017/0265478 A1* | 9/2017 | Restrepo ................ | A01N 37/46 |

FOREIGN PATENT DOCUMENTS

| | | |
|---|---|---|
| CN | 1781376 | 6/2006 |
| CN | 109627090 | 1/2019 |
| CN | 109629090 | 4/2019 |
| EP | 1538136 | 8/2005 |
| KR | 20170033764 | 3/2017 |
| RU | 2282607 | 8/2006 |
| WO | 2023/114332 | 6/2023 |

OTHER PUBLICATIONS

Islam et al., Agronomy, 10, 2020, 19 pgs.*
Meyer et al., Society for Experimental Biology, 72(2), 2021, 167-176.*
Chesapeake Bay Activities, "Sources Fate, and Transport of Nitrogen and Phosphorus in the Chesapeake Bay Watershed—Interpretations and Applications of Spatially Referenced Regression on Watershed Attributes (Sparrow) Nutrient Model Results," USGS, published Sep. 29, 2024, available at: https://www.usgs.gov/centers/chesapeake-bay-activities/science/sources-fate-and-transport-nitrogen-and-phosphorus.
Culman, S. et al., "Tri-State Fertilizer Recommendations," Bulletin 974. College of Food, Agricultural, and Environmental Sciences, Columbus OH: The Ohio State University, 2020.
International Search Report and Written Opinion for PCT/US2023/076418, mailed on Feb. 9, 2024, 16 pages.
Islam et al, Agricultural Uses of Juglone: Opportunities and Challenges, *Agronomy*, 2020, 19 pages, Creative Commons Attribution (CC), Licensee MDPI, Basel, Switzerland.
Qin et al, Effects of Micro-Molar $H_2O_2$ on Inhibiting Soil Nitrification, *Geoderma* 333, 2019, pp. 145-148, Elsevier (Journal Homepage: www.elsevier.com/locate/geoderma).

* cited by examiner

*Primary Examiner* — Kyle A Purdy
(74) *Attorney, Agent, or Firm* — RAY QUINNEY & NEBEKER; Thomas L. Lingard

(57) ABSTRACT

In some embodiments, a composition includes a nitrogen fertilizer, a reactive oxygen species, and a reactive oxygen species inducer. An effective amount of the reactive oxygen species is sufficient to increase reactive oxygen species in a plant to induce increased nitrogen uptake efficiency by the plant and increased nitrogen utilization efficiency in the plant. In some embodiments, the reactive oxygen species inducer is a black walnut extract. In some embodiments, the reactive oxygen species inducer is hydrogen peroxide.

16 Claims, 2 Drawing Sheets

COMPOSITIONS, SYSTEMS, AND METHODS FOR INCREASED PLANT QUALITY

CROSS-REFERENCE TO RELATED APPLICATIONS

This application claims priority to and the benefit of U.S. Provisional Patent Application No. 63/415,867, filed on Oct. 13, 2022, which is hereby incorporated by reference in their entireties.

BACKGROUND

Modern farming methods include the use of additives in the form of fertilizers, pesticides, insecticides, herbicides, biostimulants, and others to provide nutrients to the plants, eliminate harmful insects and other pests, eliminate weeds and other harmful plants or plants that compete for resources, and for other reasons. Many farming methods include providing plants with nutrients in the form of fertilizer. One such nutrient includes nitrogen. Nitrogen is a critical element in all plant life, and contributes to the production of DNA, proteins, and chlorophyll. A crop or a series of crops, as well as leaching to the environment, may deplete nitrogen levels in the soil. To restore nitrogen levels, a farmer may apply a nitrogen fertilizer or otherwise add nitrogen to the soil.

BRIEF SUMMARY

The present disclosure generally relates to compositions, systems, and methods for increased plant quality based on the application of an aqueous solution containing reactive oxygen species and reactive oxygen species inducers. In some embodiments, a composition includes a reactive oxygen species and a reactive oxygen species inducer. An effective amount of the reactive oxygen species and inducer is sufficient to increase a reactive oxygen species in a plant to induce nitrogen uptake efficiency by the plant and nitrogen utilization efficiency in the plant. In some embodiments, the reactive oxygen species and inducer is an aqueous solution of soluble carbon molecules and black walnut extract. In some embodiments, the reactive oxygen species and inducer is a hydroxyl, singlet oxygen, or any of nine peroxide types.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be evident from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
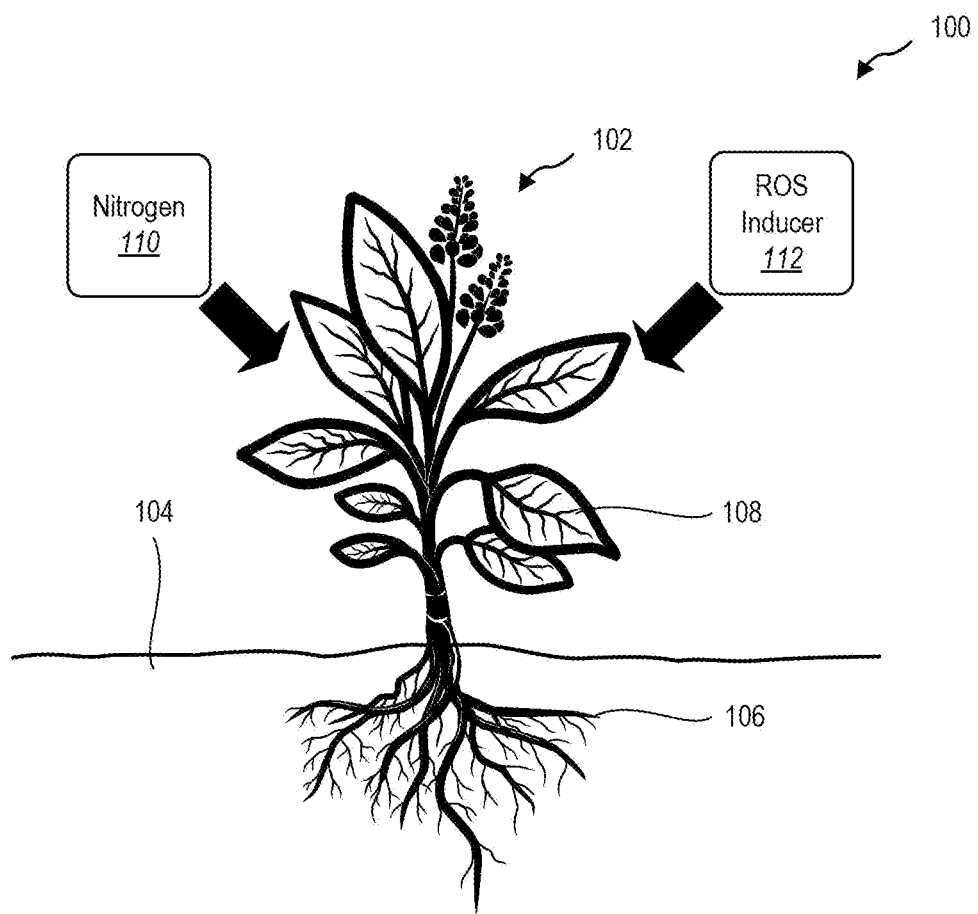
FIG. 1 is a representation of a nitrogen uptake system, according to at least one embodiment of the present disclosure.

This disclosure generally relates to compositions, systems, and methods for maintaining plant biomass based on the application of a reactive oxygen species inducer while reducing nitrogen available to the plant. The maintained biomass may be based on increased nutrient uptake efficiency to the crop and/or, increased nutrient utilization efficiency in the crop. Plant biomass is often associated with the nutrient (including nitrogen) uptake of the plant. Increasing plant nutrient uptake efficiency involves impacts on root morphology, root physiology, and root microbes. For example, plants that exhibit increased nutrient uptake efficiency absorb more nitrogen and other nutrients from the soil and/or water through the roots; plants that have increased nutrient utilization efficiency exhibit better movement of nutrients within and throughout the plant.

During farming operations, crops may reduce or deplete the levels of nutrients in the soil. For example, crops may reduce or deplete the levels or concentrations of nitrogen usable by the plant (e.g., nitrates ($NO_3$), ammonium ($NH_4$)) in the soil. This may result in less nutrient uptake by the plant in the future and in subsequent crops, thereby resulting in lower plant biomass or quality of the subsequent crops. Nutrients in the soil may be replaced using natural methods. For example, usable nitrogen levels in the soil may be increased through the process of fixing free nitrogen in the atmosphere. Nitrogen fixation may include many processes and/or organisms, including nitrogen fixing bacteria, nitrifying bacteria, nitrogen fixing plants, any other organism, and combinations thereof.

In some situations, farm operators may increase the levels of nutrients in the soil by adding and/or applying the nutrients to the soil. For example, a farm operator may increase the levels of usable nitrogen in the soil by applying nitrogen to the soil. Nitrogen fertilizer concentrations and application rates are determined based on the crop to be planted, its associated nitrogen uptake rates, soil characteristics, and other factors. Additionally, soil laboratories and university extensions can provide localized recommendations for nitrogen inputs based on crop and environmental conditions. Rarely, if ever, are there recommendations by any entity that justify even a 5% reduction of macronutrient inputs, including for nitrogen. Indeed, university extensions will associate a 50% reduction in the recommended amount of nitrogen fertilizer with a 30% to 40% decrease in crop yield. Following these recommendations, farmers and other growers typically apply the maximum recommended nitrogen fertilizer to avoid a reduction in the crop yield. An example of a University Extension is the Extension at the University of California-Davis (UC Davis). The fertilization guidelines for the US Davis Extension may be found online, such as at www.cdfa.ca.gov/is/ffldrs/frep/Fertilization-Guidelines/.

Conventionally, the best assimilation of applied nitrogen may be 50%. The unassimilated nitrogen (e.g., the remaining 50%) may be volatilized into the atmosphere as a greenhouse gas and/or leached through the soil into the ground water as a contaminant. Conventionally, the effort to increase nitrogen uptake in plants often results in excess nitrogen fertilizer applied to the soil without increasing nitrogen uptake. Excess nitrogen jams plant signaling pathways and is toxic to other plants or crops. In some situations, excess nitrogen may flow into adjacent areas. For example, rain, wind, or other transport mechanisms may cause the excess nitrogen to travel into the adjacent areas. These adjacent areas may include other fields, streams, ponds, lakes, the ocean, other adjacent areas, and combinations thereof. This may result in an accumulation of nitrogen in these areas, which may be toxic to some plant, animal, or other life and is known as eutrophication. Farm operators have long tried, without success or with limited success, to find mechanisms to reduce nitrogen application to crops while maintaining plant biomass. In accordance with at least one embodiment of the present disclosure, the techniques described herein may be utilized to reduce the nitrogen application to the soil. As used herein in one or more described embodiments and empirical trials, 100% nitrogen application is representative of the most common agronomic recommendation for a particular crop and the region in which it is grown. Similarly, any identified nitrogen reduction is a reduction from the associated most common agronomic recommendation for the crop and region.

Reactive oxygen species (ROS, "active oxygen") can be damaging to plants. There are more than a dozen positive benefits to plants that ROS provide in the balance of production and consumption of ROS. In some embodiments, soluble carbon molecules combined with ROS of black walnut help to maintain this balance of production and consumption of ROS. Elevating the levels of ROS in a plant may induce regulation of cell growth, cell cycles including programmed cell death, development of tissues, and response to biotic and abiotic stress. It is hypothesized that the characteristic of ROS as a signaling molecule create signaling pathways that allow the plant to absorb sufficient nutrients from the soil, including nitrogen. This may be a result of one or more of an increase in nitrogen uptake efficiency, an improvement in the utilization of nitrogen when in the plant which can impact the metabolism of nitrogen, a change in the soil microbial activity that prepares or otherwise fixes the nitrogen for uptake by the plant, any other process, and combinations thereof. Without knowing all the mechanisms responsible, ultimately increased nutrient uptake efficiency is achieved as plants are provided with a reduced rate of nitrogen and plant growth and reproductive functions are maintained if not improved. Applying an ROS inducer may result in increased nutrient uptake efficiency in the plant and maintained plant biomass.

In accordance with at least one embodiment of the present disclosure, an ROS and/or an ROS inducer may induce an ROS response in the plant because of its chemical nature with at least one unpaired electron. This state of ROS allows for a quick reaction with other molecules and an increase in ROS in a plant.

In accordance with at least one embodiment of the present disclosure, the ROS inducer may induce increased nutrient uptake efficiency in crops through increasing ROS in plants. Some of the fundamental components of ROS include superoxide, hydrogen peroxide, hydroxyl radicals, and singlet oxygen. It is predicted that the application of the ROS directly increases and indirectly stimulates an increase in the concentration of the active oxygen in the plant because its nature as a free radical and highly reactive. This may result in an increased amount of nutrient uptake efficiency, including an increased amount of nitrogen uptake, by the plant.

In accordance with at least one embodiment of the present disclosure, applying an ROS inducer to the crop may facilitate an increased nitrogen uptake efficiency and increased nitrogen utilization with reduced nitrogen application. The experimental results provided herein show increased nitrogen uptake efficiency by maintaining harvest weight when an ROS inducer is applied with a nitrogen fertilizer. The experimental results further show that, when the ROS inducer is applied with a reduced amount of nitrogen fertilizer, nitrogen uptake and utilization efficiency is increased and harvest biomass is maintained. It is hypothesized that there is a synergistic relationship between the ROS, the ROS inducer and the nutrient uptake system of the plant that allows for increased nutrient uptake efficiency with reduced applied nutrients. It is further hypothesized that there is a synergistic relationship between the ROS inducer and the nutrient uptake system of the plant that allows for increased nitrogen uptake and utilization efficiency with reduced applied nitrogen (i.e., reduced applied nitrogen fertilizer).

In accordance with at least one embodiment of the present disclosure, the ROS and/or the ROS inducer may help to increase the overall soil health. For example, during application of the ROS and/or the ROS inducer, the ROS and/or ROS inducer may help to increase biological activity in the soil, thereby promoting increased soil health. In some embodiments, the ROS and/or the ROS inducer may help to increase soil nitrogen fixation by free fixing nitrogen organisms. In this manner, the ROS and/or the ROS inducer may help to improve the nitrogen utilization and/or nitrogen efficiency by improving the soil conditions in which the plant is planted.

The present disclosure utilizes a variety of terms to describe features and advantages of the efficient nitrogen uptake system. Additional detail is now provided regarding the meaning of such terms. For example, as used herein, the term "plant quality" refers to one or more metrics used to determine the health or value of a plant or a crop. In some embodiments, plant quality is a quantifiable metric. For example, plant quality may be quantified using one or more plant quality parameters. The plant quality parameters may include chlorophyll readings with a Spad Meter (e.g., the transmissibility of red light and/or infrared light through a leaf), verdure (measure of greenness), vigor (e.g., how big and how quickly a plant grows), canopy (e.g., the canopy cover of the plant), days to germination, days to emergence, germination percentage, survival, disease prevalence, root development, other plant quality parameters, and combinations thereof. In some embodiments, plant quality refers to a single plant quality parameter. In some embodiments, plant quality refers to a combination of two or more plant quality parameters.

The term "plant biomass" includes plant weight, above ground biomass (wet and dry), below ground biomass (wet and dry), harvest weight, harvest yield, and harvestability. In some embodiments, the harvest weight may refer to the weight of the harvested crop. The harvest weight may be based on a reference, such as weight per unit (e.g., weight per fruit, berry, kernel, stalk), weight per field (e.g., weight per acre), weight per plant (e.g., weight per tree, stalk, bush), any other reference, and combinations thereof. In some embodiments, the harvest yield may refer to the volume of the harvested crop. The harvest yield may be based on a reference, such as yield per field (e.g., bushels per acre), yield per plant (e.g., bushels per tree, stalk, bush), any other reference, and combinations thereof. Harvestability may refer to the capacity or ability to be harvested. For example, harvestability may refer to whether a crop ripens during the growing season. In some examples, harvestability may refer to whether (or to what percentage) a crop is damaged during harvesting.

As used herein, a "nitrogen fertilizer" may include any fertilizer that includes nitrogen. A nitrogen fertilizer may include any type of nitrogen. In some embodiments, a nitrogen fertilizer may include nitrogen in any form of fixation. In some embodiments, a nitrogen fertilizer may include one or more of natural ammonia ($NH_3$), synthetic ammonia ($NH_3$), anhydrous ammonia ($NH_3$), nitric acid ($HNO_3$), ammonium ($NH_4^+$), ammonium nitrate ($NH_4NO_3$), urea ($CO(NH_2)_2$), nitrate ($NO_3^-$), any other type of nitrogen, and combinations thereof. Nitrogen fertilizers are applied to a crop in any format, such as a solid, a liquid, gas, injected into the soil, any other application format, and combinations thereof. In some embodiments, the nitrogen fertilizer may be a pre-packaged nitrogen fertilizer having known composition and concentrations of nitrogen. Such nitrogen fertilizers may include CAN (calcium-nitrogen or calcium ammonium nitrate) 17 (e.g., 17-0-0) or any other type of nitrogen fertilizer.

As used herein, a reactive oxygen species (ROS) includes reactive chemicals formed from elemental oxygen (e.g., $O_2$), which may serve as a source of oxygenated radicals. An ROS is often called an "activated oxygen species." An ROS may include one or more of peracetic acid ($CH_3CO_3H$), hydroxyl radical (OH), singlet oxygen ($^1O_2$), alpha-oxygen ($\alpha$-O), sodium peroxide ($Na_2O_2$), potassium oxide ($K_2O$), potassium peroxide ($KO_2$), calcium peroxide ($CaO_2$), urea peroxide (hydrogen peroxide-urea, $CH_6N_2O_3$), hydrogen peroxide ($H_2O_2$), hydroperoxides (ROOX), peroxides (ROOR), and superoxides ($O_2^-$), where R is an alkane, alkene, or alkyne, branched or unbranched, and of between 1 and 12 carbons and Ar is an aromatic ring, usually of 6 carbons, or a combination of such rings, any other reactive oxygen species or activated oxygen species, and combinations thereof. In some embodiments, the ROS may include a natural ROS, or an ROS prepared from or extracted from a plant or animal source. ROS levels in a plant may be the levels or concentrations of an ROS or a group of ROS in a plant.

As used herein, the term "nutrient" refers to any material that is beneficial for the growth of plants and their associated crops. A nutrient may be a chemical, ion, compound, element, any other material, and combinations thereof. Examples of nutrients for plants include nitrogen (N), phosphorous (P), potassium (K), calcium (Ca), magnesium (Mg), sulfur (S), any other nutrients, and combinations thereof. Nutrients may include chemical compounds and/or ions of elements.

As used herein, the term "ROS response" refers to the response of the plant based on increased ROS or active oxygen levels in the plant. As discussed herein, elevated ROS levels are associated with increased nutrient uptake efficiency. In some examples, the ROS response may directly increase nitrogen uptake efficiency by the plant and nitrogen utilization efficiency in the plant or indirectly through cascading effects. For example, the ROS response may induce or allow biological functions such as chemical reactions, metabolic pathways, or other activities in the plant cellular and/or macro structure that results in increased nutrient uptake efficiency in the plant.

As used herein, the term "ROS inducer" refers to a material that induces an ROS response in a plant. An ROS inducer may include any material, compound, molecule, composition, mixture, extract, or other material that induces an ROS response in a plant. For example, an ROS inducer may include a composition that, when absorbed by the plant, induces the ROS response. In some examples, an ROS inducer may include a ROS. In some example, an ROS may include any other composition, such as a naphthoquinone and/or a naphthoquinone derivative, as discussed in further detail herein. In some embodiments, the ROS inducer may include any combination of materials, including naphthoquinones, naphthoquinone derivatives, ROS, any other ROS or ROS inducer, and combinations thereof. As used herein, and unless explicitly stated otherwise, references to ROS inducer may include any ROS inducer, signaling molecule, ROS, or other molecule or compound used to produce an ROS response. In some embodiments, the ROS inducer may signal the plant to produce protective compounds, such as antioxidants. A production of these protective compounds may lead to increased nutrient efficiency and/or utilization, including increased nitrogen efficiency and/or utilization.

As used herein, the term "efficiency" relates to the usage of a nutrient with respect to the amount of nutrient applied to a particular plant. For example, a high efficiency may result in higher usage of a nutrient by the plant. In some examples, a high efficiency may result in a higher uptake of the nutrient by the plant.

As used herein, the term "nutrient uptake" or "nutrient uptake efficiency" is used to describe the mechanism by which it is hypothesized that plant biomass is maintained. While the exact mechanism remains unknown, it is hypothesized that an increase in the efficiency of nutrient uptake in the plant is responsible for the maintenance of plant biomass discussed herein. Such increased efficiency in nutrient utilization may, without limiting the present disclosure, result in increased nutrient uptake, increased efficiency in nutrient uptake, increased root mass, increased root activity, any other nutrient uptake mechanism, and combinations thereof.

As a specific example of nutrient uptake and nutrient uptake efficiency, the term "nitrogen uptake" or "nitrogen uptake efficiency" is used to describe the mechanism by which it is hypothesized that plant biomass is maintained. While the exact mechanism remains unknown, it is hypothesized that an increase in the efficiency of nitrogen uptake in the plant is responsible for the maintenance of plant biomass discussed herein. Such increased efficiency in nitrogen utilization may, without limiting the present disclosure, result in increased nitrogen uptake, increased efficiency in nitrogen uptake, increased root mass, increased root activity, any other nitrogen uptake mechanism, and combinations thereof.

As used herein, the term "nutrient utilization efficiency" is used to describe the movement of nutrients within the plant. The utilization of nutrients inside the plant means increased physiological efficiency, better movement of nutrients and other solutes in tissues and between cells, and especially remobilization throughout the plant. Increased nutrient utilization efficiency impacts both plant biomass and plant quality parameters. For plant quality parameters, nutrient utilization efficiency influences macro and micro-nutrients throughout the plant including the reproductive parts that are harvested and constitute yield.

As a specific example of nutrient utilization efficiency, the term "nitrogen utilization efficiency" is used to describe the movement of nitrogen within the plant. The utilization of nitrogen inside the plant means increased physiological efficiency, better movement of nitrogen and other solutes in tissues and between cells, and especially remobilization throughout the plant. Increased nitrogen utilization efficiency impacts both plant biomass and plant quality parameters. For plant quality parameters, nitrogen utilization efficiency influences macro and micro-nutrients throughout the plant including the reproductive parts that are harvested and constitute yield.

The term "crop," as used herein usually refers to plants raised in fields in an agricultural setting, and includes plants intended for human or animal consumption, plants intended for use as fibers, plants to be used as or processed into medicaments, plants grown for fragrance, flowers, herbs, and decorative, recreational, and ornamental plants. In this context, the term includes tree farms, such as those growing conifers to be used as Christmas trees, and grasses grown for use as turf. The term can also encompass plants grown hydroponically, in soil, in greenhouses, in any other manner, and combinations thereof.

As used herein, the terms "apply," "applied," "applying," "application," and other forms of the word "apply" refer to placing the compositions of the present disclosure in a location usable by a crop. The term "apply" may refer to any application mechanism used to apply compositions to crops. For example, the compositions of the present disclosure may be applied to the soil in which a crop is planted, to the roots of a plan, basal application, top dressing, side dressing, foliar application, drill and placement, broadcasting, fertigation, any other application mechanism, and combinations thereof.

Contacting soil in communication with the roots of a plant with a composition of the present disclosure refers to soil in sufficiently close proximity to the roots of plants intended to be treated that the amount of the composition applied can be reasonably expected to reach the roots of the target plants. For example, a thin film of water surrounding the roots of a plant may be in communication with water and nutrients in the soil. This may allow the roots to absorb water and nutrients in the soil that are in proximity to the roots. With respect to crops in a field or trees in an orchard, for example, the phrase refers to soil surrounding the roots of the crops in that field or the trees in that orchard.

As used herein, an "effective amount" of a composition is an amount that, when applied to a crop, results in an increased uptake efficiency of nitrogen in the plants. The effective amount may be based on the application mechanism. As a specific, non-limiting example, the effective amount of the composition may be the amount that is applied to soil proximate (e.g., within 24 in. (61.0 cm), 12 in. (30.5 cm), 6 in. (15.2 cm), 3 in. (7.6 cm), 1 in. (2.5 cm), 0.5 in. (1.3 cm), less than 0.5 in. (1.3 cm), or any value therebetween) the roots of a plant. In some examples, the effective amount may be otherwise applied to any part of the plant itself. In some embodiments, the effective amount may increase the uptake efficiency of nutrients by 1%, 5%, 10%, 20%, 30%, 40%, 50%, or more. In some embodiments, the effective amount may be the amount of the ROS or ROS inducer applied to the plant or the crop. In some embodiments, the effective amount may be the amount of nitrogen fertilizer applied to the plant or the crop. In some embodiments, the effective amount may be a combination of the amount of the ROS or ROS inducer and the nitrogen fertilizer applied to the plant or the crop.

FIG. 1 is a representation of a nitrogen uptake system 100, according to at least one embodiment of the present disclosure. The nitrogen uptake system 100 includes a plant 102 planted in soil 104. The plant 102 includes roots 106 in the soil 104 and leaves 108 above the soil 104 and exposed to the sun.

In accordance with at least one embodiment of the present disclosure, nitrogen 110 may be applied to the plant 102. The nitrogen 110 may be applied to the plant 102 in any manner. For example, the nitrogen 110 may be applied to the soil 104, the leaves 108, and/or the roots 106 of the plant 102. In some embodiments, the nitrogen 110 is a nitrogen fertilizer. For example, the nitrogen 110 may be combined with other fertilizing nutrients, such as calcium, phosphorous, potassium, any other fertilizing nutrient, and combinations thereof.

In some embodiments, the nitrogen 110 is applied separately from an ROS inducer 112. For example, the nitrogen 110 may be applied at different times than the ROS inducer 112. In some embodiments, the nitrogen 110 and the ROS inducer 112 may be applied simultaneously. In some embodiments, the nitrogen 110 and the ROS inducer 112 may be applied at or around the same time. For example, the nitrogen 110 and the ROS inducer 112 may be dissolved in irrigation water applied to the leaves 108 and/or the soil 104. In some examples, the ROS inducer 112 may be applied through a foliar application. For example, the ROS inducer 112 may be mixed in a spray tank and sprayed onto the foliage of a plant. This may cause the ROS inducer 112 to remain on the leaves of the plant, thereby allowing at least a portion of the ROS inducer 112 to be at least partially absorbed by the leaves of the plant and/or induce an increased ROS response. In some embodiments, the nitrogen 110 and/or the ROS inducer 112 may be applied by injection into the soil. For example, the nitrogen 110 and/or the ROS inducer 112 may be injected into the soil through a shank applied down the crop row. In some embodiments, the ROS inducer 112 may be applied by spraying the ROS inducer 112 and/or nitrogen 110 on top of the soil. Water applied to the soil may push the ROS inducer 112 and/or the nitrogen 110 through the soil to the roots. For example, a sprayer including a ROS inducer 112 and nitrogen 110 solution may be set to spray the solution on the soil, and the solution may be applied directly to the soil prior to irrigation or other watering of the soil. In some embodiments, the nitrogen 110 and the ROS inducer 112 may be applied using the same application technique (e.g., foliar, soil) and/or the same application medium (e.g., mixed in the same solution). In some embodiments, the nitrogen 110 and the ROS inducer 112 may be applied using different application techniques and/or application medium (e.g., mixed in different solutions).

It will be appreciated that some crops may experience different levels of nitrogen uptake and utilization efficiency during different parts of their growth cycle. In accordance with at least one embodiment of the present disclosure, the ROS inducer 112 may be applied with each application of the nitrogen 110. For example, each time a nitrogen fertilizer is applied to the soil 104, the ROS inducer 112 may be applied at the same time. In some examples, the ROS inducer 112 may be applied after application of the nitrogen 110. For example, the nitrogen 110 may be applied as part of a fertilizer, and the ROS inducer 112 may be applied during a growth phase that is particularly sensitive to nitrogen uptake, such as during flowering or fruiting of a crop. In some examples, the ROS inducer 112 may be applied during nitrogen assimilation by the plant 102. In some examples, the nitrogen 110 may be applied at the end of a growing season, such as during the fall and/or winter, and the ROS inducer 112 may be applied in the spring during planting, germination, and/or sprouting of the plant 102. In some embodiments, the nitrogen 110 and the ROS inducer 112 may be applied at any time with respect to each other. In some embodiments, the ROS inducer 112 may be blended with the nitrogen 110 prior to application, and the blended ROS inducer 112 and nitrogen 110 may be applied to through the soil, through foliar application, or through soil injection.

In some embodiments, it is believed that the ROS inducer 112 may be most effectively absorbed through the roots 106 of the plant 102. In this manner, root-based application of the ROS inducer 112 may help to improve the nitrogen and other nutrient uptake efficiency in the plant 102, thereby improving plant quality. In some embodiments, the ROS inducer 112 may be absorbed through the leaves 108 of the plant 102. In this manner, the ROS and ORS inducer 112 may be applied via foliar application.

In some embodiments, it is believed, and without being bound by theory, that the ROS inducer 112 may be effectively absorbed through the leaves or foliage of the plants. In this manner, a foliar application of the ROS inducer 112 may cause an increase in the ROS levels of the plant 102. In some embodiments, a foliar application of the ROS inducer 112 may cause an ROS response or an increased ROS response in the plant 102. In some embodiments, the ROS inducer 112 may be applied with a combination of a foliar and a root application. This may help to further increase the ROS response in the plant.

The ROS inducer 112 may be any compound that may cause the ROS levels in the plant 102 to be increased. In some embodiments, the ROS inducer 112 may be plant-based. For example, and as will be discussed in further detail herein, the ROS inducer 112 may include an extract of a plant, such as a black walnut extract. In some embodiments, application of a black walnut extract may cause ROS levels in the plant 102 to be increased, thereby increasing the uptake efficiency of nitrogen 110 by the plant 102. In some embodiments, application of a black walnut extract may induce an increased ROS response in the plant 102. In some embodiments, the black walnut extract may be in aqueous solution with soluble carbon molecules. The black walnut extract and soluble carbon mixture may help to induce an increased ROS response in the plant 102.

The ROS inducer 112 may include an extract formed from any plant family that produces a naphthoquinone ($C_{10}H_6O_2$) and/or a naphthoquinone derivative. In some embodiments, the naphthoquinone may include 1,4-naphthoquinone. Different derivative concentrations and combinations with other compounds such as naphthoquinone juglone can be phytotoxic to some plants (Babula et al. 2014). In some embodiments, the naphthoquinone may include other isomers of a naphthoquinone, such as 1,2-naphthoquinone or 2,6 naphthoquinone. In some embodiments, the naphthoquinone may include a hydroxynaphthoquinone. In some embodiments, the naphthoquinone may include dihydroxynaphthoquinone ($C_{10}H_6O_4$), trihydroxynaphthyquinone ($C_{10}H_6O_5$), tetrahydroxynaphthoquinone ($C_{10}H_6O_6$), pentahydroxynaphthoquinone ($C_{10}H_6O_7$), hexahydroxynaphthoquinone ($C_{10}H_6O_8$), any other naphthoquinone derivative, and combinations thereof. In some embodiments, the naphthoquinone may include a derivative of a naphthoquinone. In some embodiments, the 1,4-naphthoquinone derivatives may include 2-hydroxy-1,4-naphthoquinone (lawsone), 5-hydroxy-1,4-naphthoquinone (juglone), 6-hydroxy-1,4-naphthoquinone, any other 1,4-naphthoquinone derivatives, and combinations thereof.

As used herein, a naphthoquinone-producing plant may include any plant that produces naphthoquinone and/or derivatives of naphthoquinone. For example, a 1,4-naphthoquinone-producing plant may include any plant that produces 1,4-naphthoquinone and/or derivatives of 1,4-naphthoquinone. In some examples, a 1,4-naphthoquinone-producing plant may produce 1,4-naphthoquinone, hydroxynaphthoquinone, other naphthoquinone derivatives, other naphthoquinones, and combinations thereof. In some examples, a 1,4-naphthoquinone-producing plant may directly produce 1,4-naphthoquinone, hydroxynaphthoquinone, naphthoquinone derivatives, and combinations thereof. In some examples, a 1,4-naphthoquinone-producing plant may produce precursors to 1,4-naphthoquinone, hydroxynaphthoquinone, naphthoquinone derivatives, and combinations thereof. The precursors may result in one or more of the 1,4-naphthoquinone, hydroxynaphthoquinone, and naphthoquinone derivatives at any point during processing, such as after harvesting, during extraction, after extraction, at any other point during processing, and combinations thereof.

Plant families that produce 1,4-naphthoquinones and derivatives thereof (e.g., 1,4-naphthoquinone-producing plants) may include, but are not limited to, Juglandaceae, Plumbaginaceae, Ebenaceae, Boraginaceae, Dioncolphyllaceae, Ancistrocladaceae, Iridaceae, Verbenaceae, Scrophulariaceae, Avicennieae, Balsaminaceae, Bignoniaceae, Gentianaceae, Droceraceae, Asteraceae, any other plant family or species that produces 1,4-naphtoquinones and derivatives thereof, and combinations thereof. In some embodiments, certain algae, fungi, bacteria, and animals may produce 1,4-naphthoquinones or derivatives thereof. In some embodiments, the ROS inducer 112 may include an extract from trees of the genus *Juglans*. As discussed herein, juglone is not an ROS, but is a 1,4-naphthoquinone derivative. 1,4-naphthoquinone extracts have been found to induce an increase in the ROS levels of a plant or a crop. In some embodiments, the presence of 1,4-naphthoquinone may be a useful marker for members of the Juglandaceae that are useful for preparing the compositions of the invention. Members of the genus *Juglans* are preferred. The ROS inducer 112 may include an extract from the species *J. nigra* (black or American walnut), *J. regia* (English walnut), and *J. cinerea* (butternut). In some embodiments, extracts from *J. nigra* may be critical to increasing the ROS levels in a plant. However, it should be understood that materials from one or more members of the Juglandaceae can be used together to form the compositions of the invention. For example, material from *J. nigra, J. cinerea*, and *J. regia*, or from any two of these, may be mixed together and used as the ROS inducer 112. It should be recognized that one or more members of any plant family that produce 1,4-naphthoquinones may be combined or used individually to achieve the result of inducing ROS stimulation internally within the plant.

The ROS inducer may be formed from any part of the plants, including the 1,4-naphthoquinone and/or derivatives thereof. The highest amounts of activity have been noted using the nut hulls and the leaves, with the hulls producing the strongest ROS inducer 112 effect. Every other part of the tree tested thus far, however, has also had activity and can be used, including the roots, leaves, fruit, flowers, wood, bark, shells. Walnuts will generally not be used for preparing the compositions of the invention simply because the nuts usually cost more per pound than wood chips, nuthulls, bark, and other by products of nut or wood production. But walnuts may be used to make the compositions of the invention if desired. If nuts are used in making the compositions, it is desirable that other portions of the plants also be included in the materials to be extracted.

The present disclosure provides an extra economic use for waste parts of the trees used to form the compositions of the present disclosure. For example, hulls (also known as husks) are a waste product of walnut production, while sawdust and wood chips are waste products of producing walnut wood for furniture and other uses. These waste materials may be used in producing the compositions of the invention. Moreover, after being used to produce the compositions of the present disclosure, the materials may be dried and then used, for example, as biomass in power generation or, in the case of wood chips and sawdust, as a base for forming manufactured wood products and the like. Since these waste materials are produced in the course of other uses, they may be relatively inexpensive and reduce the cost of preparing the compositions, while providing an extra benefit to the grower or processor, who may obtain value for materials that may otherwise need to be disposed of economically.

In accordance with at least one embodiment of the present disclosure, the compositions of the present disclosure are extracts of the plant materials described above in an extraction solution. The extraction solution may include an aqueous solution of an alcohol, in an acid, an aqueous solution of an acid, or an aqueous acid-alcohol solution. Alcohol extraction may result in compositions with the highest ROS-increasing activity. Any type of alcohol may be used, including methanol, isopropanol, and ethanol. While 1,4-naphthoquinone is known to be soluble in ethanol, a number of other naphthoquinones are also present in the plant materials that can be used in making the compositions of the invention, and are also known to be soluble in ethanol. Walnut hulls, for example, comprise 1,4-naphthoquinone and 1,4-naptoquinone derivatives, including juglone (5-hydroxy-1,4-naphthoquinone), 2-methyl-1,4-naphthoquinone, and plumbagin (5-hydroxy-2-methyl-1,4-naphthoquinone). The hulls also contain tannins and iodine. A number of compounds of other types may also be present in the compositions of the present disclosure. For example, the leaves of *J. regia* (English walnut) are known to contain, in addition to juglone, ascorbic acid, carotene, quercetin, cyanadin, kaempferol, caffeic acid, and traces of p-coumaric acid, hyperin (0.2%), quercitrin, kaempferol 3-arabinoside, and quercetin-3-arabinoside. Without being bound by theory, it is believed that it is one or more of the other constituents present, or a synergism due to the combination of some or all of the constituents, that is responsible for the dramatic increased nitrogen uptake and utilization efficiency activity seen with the compositions of the present disclosure compared to juglone alone. In some embodiments, the extraction solution may be mixed with soluble carbon molecules.

A black walnut extract was prepared and analyzed for its component concentrations using gas chromatography. At a detection limit of 2 parts per million (ppm), acetic acid was found to have a concentration of approximately 6,100, ethyl acetate was found to have a concentration of approximately 600 ppm, 1,1-diethoxypropane was found to have a concentration of 3 ppm, and unidentified glycols were found to have a combined concentration of 94 ppm. Using gas chromatography, juglone, lawsone, plumbagin, and 1,4 naphthoquinone were not detected in the sample. Thus, it is hypothesized that the presence of these compounds in a material is a signal for other ROS inducing compounds.

It is also noted that ethanol extracted compositions are surprisingly more effective than water extractions, and that the naphthoquinones are soluble in alcohol. Thus, it is surmised that it is the combination of 1,4-naphthoquinone and other naphthoquinones that are particularly responsible for the dramatic nutrient absorption effects using the compositions of the invention in the methods of the invention, although other components may also be involved. It should be noted that, while 1,4-naphthoquinone is not considered to be responsible by itself for the nutrient absorption effects of the compositions of the present disclosure, it is considered to be a marker for the presence of other compounds, such as other naphthoquinones, which by themselves or together may be responsible for these effects.

The acid or alcohol used to prepare the plant extract may be present at a concentration, by weight, of between 10% and 90%, between about 20% and 80%, or between 40% and 75%. For alcohol extractions, particularly good results have been found using a concentration between about 50% and about 70% by weight of alcohol. While alcohols such as ethanol can be obtained in a pure form (e.g., "absolute" ethanol), they are typically commercially available as a high percentage solution in water. Ethanol, for example, is typically available commercially as a 95% solution of alcohol in water. In the studies underlying the invention, a 70% solution of ethanol was used and may be used based on the ease of handling. In the U.S., ethanol is often denatured to ensure that it is not used for drinking purposes without payment of the appropriate Federal taxes. If denatured ethanol is used, it should be denatured with a denaturant that is not toxic to plants at the concentration at which it would be present when the extract is applied to the soil.

In some embodiments, the extraction solution may include up to 95.6% alcohol. In some embodiments, the extraction solution may include 30% to 95.6% alcohol. In some embodiments, the extraction solution may include 30% to 70% alcohol. In some embodiments, it may be critical that the extraction solution includes 30% to 70% alcohol to improve the extraction of 1,4-naphthoquinone and its associated derivatives.

In some embodiments, the extraction solution may include up to 99% acid (such as glacial acetic acid). In some embodiments, the extraction solution may include 30% to 99% acid. In some embodiments, the extraction solution may include 30% to 70% acid. In some embodiments, it may be critical that the extraction solution includes 30% to 70% acid to improve the extraction of 1,4-naphthoquinone and its associated derivatives.

In some embodiments, the extraction solution may include an aqueous acid-alcohol solution. In some embodiments, the aqueous acid-alcohol solution may include 30%-70% alcohol and 30-70% acid. In some embodiments, it may be critical that the aqueous acid-alcohol solution includes 30%-70% alcohol and 30-70% acid to improve the extraction of 1,4-naphthoquinone and its associated derivatives.

In some embodiments, the extract may be prepared with a water base. For example, plant material, such as black walnut plant material, may be soaked in water to prepare the extract. In some embodiments, the water extract may be boiled to prepare the extract.

In some embodiments, the extract may be prepared with a carbon dioxide extraction process. For example, the plant matter may be placed in a container having a controlled temperature, pressure, and concentration of carbon dioxide.

The carbon dioxide may facilitate the extraction of 1,4-naphthoquinone and other materials from the plant material.

The compositions of the present disclosure may include extracts of the plant materials described above in an aqueous solution of an alcohol, in an acid, in an aqueous solution of an acid, or in an alcoholic solution of an acid. In some embodiments, an alcohol extract may use glacial acetic acid. It is believed that a solution in which the acetic acid is diluted to between about 30-80%, about 40-60%, or about 50% would result in improved extraction of ROS inducing substances from the plant material.

Acid extraction of the plant materials may result in compositions with ROS increasing activity that is surprisingly higher than extracts made from the same material using only water. The acid may not be toxic to plants, and may be environmentally friendly. The acid may be an organic acid, such as acetic, citric, peracetic, and isocitric acids. Acetic acid and citric acid, in particular, are widely available, inexpensive, and not harmful to plants at the concentrations the compositions are applied in the field.

While embodiments of the present disclosure may discuss application of the extraction solution and/or a solution including the extraction solution, it should be understood that the ROS inducer 112 may take any form. For example, the ROS inducer 112 may be prepared as a powder. A powder may increase the ease of shipping and handling. In some examples, the ROS inducer 112 may be prepared as a powder by drying, precipitating, or otherwise solidifying the components of the extract.

The ROS inducer 112 may include a mixture and/or a solution of one or more materials. For example, the ROS inducer 112 may include a mixture and/or a solution of one or more of water, alcohol, acid, acid-alcohol, aqueous acid-alcohol, extracted elements black walnut extract, one or more ROS, any other elements, and combinations thereof.

In accordance with at least one embodiment of the present disclosure, the ROS inducer 112 may include an ROS or multiple different types of ROS. The ROS, when applied to the plant, may act as an ROS inducer. In some embodiments, the ROS inducer 112 may include a concentration of an ROS. For example, the ROS inducer 112 may include a concentration of hydrogen peroxide or other peroxide. In some embodiments, a concentration of a plant extract-based ROS inducer 112 may be about 1 ppm to about 500,000 ppm. In some embodiments, a concentration of a plant extract-based ROS inducer 112 may be about 1500 ppm to about 20,000 ppm. In some embodiments, a concentration of a plant extract-based ROS inducer 112 may be about 2000 ppm to about 15,000 ppm. In some embodiments, a concentration of a plant extract-based ROS inducer 112 may be about 3000 ppm to about 10,000 ppm. In some embodiments, a concentration of a plant extract-based ROS inducer 112 may be about 3,500 ppm to about 8,000 ppm. In some embodiments, a concentration of a plant extract-based ROS inducer 112 may be about 4,000 ppm to about 7,000 ppm. In some embodiments, a concentration of a plant extract-based ROS inducer 112 may be about 4500 ppm to about 6,000 ppm. In some embodiments, a concentration of a plant extract-based ROS inducer 112 may be about 5000 ppm to about 10,000 ppm. In some embodiments, it may be critical that the concentration of a plant extract-based ROS inducer 112 is between 5,000 ppm and 10,000 ppm to increase the ROS levels of the plant to increase nitrogen uptake and utilization efficiency. As used herein, the term "about" recognizes that it is difficult to obtain a precise application and that the concentration of the composition will likely vary within about 200 ppm or more in any given application. It is also understood that such small variations will not have any measurable effect on the ROS-increasing efficacy of the ROS inducer 112.

In some embodiments, the ROS or ROS inducer 112 solution that is applied to the plant 102 may include a soluble carbon. For example, the soluble carbon may include one or more acids, such as humic acid and/or fulvic acid. In some embodiments, the ROS or ROS inducer 112 may include a leonardite extract. The leonardite extract may include the soluble carbon. In some embodiments, the leonardite extract may be present in the ROS or ROS inducer 112 with a concentration range of between 0.1% and 50%. For example, the leonardite extract may be present in the ROS or ROS inducer 112 with a concentration of 0.1%, 0.5%, 1%, 5%, 10%, 15%, 20%, 25%, 30%, 35%, 40%, 45%, 50%, or any value therebetween.

In some embodiments, the ROS inducer 112 may be applied with an application rate. The application rate may be the amount of the ROS inducer 112 solution that is applied per land area. In some embodiments, the application rate may be the amount of ROS inducer 112 solution that is applied via foliar and/or soil injection. In some embodiments, the application rate may be in a range having an upper value, a lower value, or upper and lower values including any of 0.01 gal/acre, 0.05 gal/acre, 0.1 gal/acre, 0.2 gal/acre, 0.3 gal/acre, 0.4 gal/acre, 0.5 gal/acre, 0.6 gal/acre, 0.7 gal/acre, 0.8 gal/acre, 0.9 gal/acre, 1.0 gal/acre, 1.1 gal/acre, 1.2 gal/acre, 1.3 gal/acre, 1.4 gal/acre, 1.5 gal/acre, 2 gal/acre, 5 gal/acre, 10 gal/acre, 20 gal/acre, 30 gal/acre, 40 gal/acre, 50 gal/acre, 75 gal/acre, 100 gal/acre, or any value therebetween. For example, the application rate may be greater than 0.01 gal/acre. In another example, the application rate may be less than 100 gal/acre. In yet other examples, the application rate may be any value in a range between 0.01 gal/acre and 100 gal/acre. In some embodiments, it may be critical that the application rate is between 0.25 and 3 gal/acre to improve the ROS response in the crop.

In some embodiments, the ROS inducer 112 may include a synthetic ROS. For example, the ROS inducer 112 may include hydrogen peroxide. The hydrogen peroxide may have any concentration. For example, the hydrogen peroxide may have a concentration of 10 ppm, 50 ppm, 100 ppm, 250 ppm, 500 ppm, 1,000 ppm, 2,500 ppm, 5,000 ppm, 10,000 ppm, 25,000 ppm, 50,000 ppm, 100,000 ppm, or any value therebetween. In some embodiments, the hydrogen peroxide may have a concentration of between 10 ppm and 100,000 ppm. In some embodiments, the hydrogen peroxide may have a concentration of between 100 ppm and 50,000 ppm. In some embodiments, it may be critical that the hydrogen peroxide has a concentration of between 1,000 ppm and 10,000 ppm to improve the ROS response in the plant or crop.

In some embodiments, the extract and/or the compositions of the present disclosure may include a surfactant. The surfactant may help to improve transport through soil and/or absorption by the plant. For example, a surfactant may help the ROS inducer to travel from the place of application to the roots (e.g., improve the penetration of the ROS inducer). This may allow more of the ROS inducer to be absorbed by the roots of the plant and/or to improve the effectiveness of the ROS inducer. The surfactant may include between 0.01% and 50% by weight of the composition to help the solution filter through the soil and contact the plant roots.

In accordance with at least one embodiment of the present disclosure, the composition including the nitrogen fertilizer may include one or more other ingredients. For example, the composition may further include one or more of menadione, lysine, isoleucine, salicylic acid, or melatonin. These ingredients may help to increase the nitrogen uptake and utilization efficiency and/or improve plant quality of the plant or crops. It has been found that each of these ingredients may have a synergistic effect when added to the compositions of the present disclosure. For example, adding menadione (e.g., vitamin $K_3$) may synergistically work with the ROS inducer to provide improved nutrient uptake efficiency, improved plant quality, improved harvest weight, other benefits, and combinations thereof, than when menadione, the black walnut solution, or the nitrogen fertilizer are applied alone to the plant. Similarly, adding lysine, isoleucine, salicylic acid, or melatonin may help to synergistically increase the ROS response in plants than an application of any of these ingredients alone, the black walnut extract alone, or the nitrogen fertilizer alone. While the exact mechanism for the improved plant quality is unknown, it is theorized that these additional ingredients may help to improve the ROS response and/or other improve the response in other pathways in the plant to increase nutrient uptake efficiency, plant biomass, and plant quality.

Application Methods

It will be recognized that the intention is to have an effective concentration of the compositions to be applied in any and all manners to a crop, including soil, roots, foliar, or otherwise. As a specific, non-limiting example, the compositions are applied to provide a concentration of the ROS inducer between about 1 ppm and 10,000 ppm at and around the roots. For most plants, early in their life, the roots will be close to the surface and the concentration at the roots will be close to that applied to the surface. Young plants and plants of some species, such as the grasses used on golf courses, lawns and parks, tend to have short, fibrous roots. For these plants, applications of between about 1 ppm and 10,000 ppm of the ROS inducer to the soil surface will provide approximately that concentration to the roots and to the soil around the roots to improve nitrogen uptake and utilization efficiency and plant quality.

While some grasses and younger plants have shallow root structures, many plants and many more mature plants have deeper root structures, often 4 to 12 inches into the soil. In some embodiments, the majority of roots involved in nutrient and water uptake occur in the top 12 inches of soil, while deeper roots tend to be involved in anchoring the plants. In sandy, aerated soils, the roots involved in nutrient transport can extend down to 18 inches. Penetration of the compositions of the present disclosure may be provided to roots in the top 12 inches of soil to improve nutrient uptake efficiency.

The compositions of the invention can be applied in several ways. As may be understood, 30,000 gallons of water will typically soak 1 acre to a depth of 12 inches (an "acre-foot"). To provide 5000 ppm of the compositions of the invention, 15 gallons of the compositions are added to the water supply and applied to the field. Alternatively, 30,000 ppm of the composition can be applied to the surface of the soil, with a water "push" of applying water to the soil to move the composition into the acre-foot of soil to provide a concentration of 5000 ppm down to 12 inches. Such "water pushes" to create concentration gradients are commonly used by farmers in applying agricultural chemicals.

It will be appreciated that for a golf course, which has grasses with roots penetrating only to perhaps the first 5-6 inches of soil, only 1000 to 1500 gallons of water may be needed, and only 6-7.5 gallons of the compositions are needed to provide 5000 ppm of the composition in the water.

It should be noted that the farmer is usually well aware of the flow rate per acre of the irrigation or other soil application system in place on his or her property, as well as the acreage to be covered. The farmer can calculate the amount of water which will be used in watering the land for any particular amount of time (for example, 300 gallons per minute times 50 acres times 30 minutes is 450,000 gallons of water). The farmer can then calculate how much is needed to result in an application of the desired concentration of the solution.

In some embodiments, the compositions of the present disclosure induce the ROS response when the plant is in contact with the composition for a contact period. In some embodiments, the contact period may be in a range having an upper value, a lower value, or upper and lower values including any of 1 min, 2 min, 5 min, 10 min, 30 min, 1 hour, 2 hours, 5 hours, 10 hours, 20 hours, 1 day, 2 days, 3 days, 5 days, 10 days, or any value therebetween. For example, the contact period may be greater than 1 min. In another example, the contact period may be less than 10 days. In yet other examples, the contact period may be any value in a range between 1 min and 10 days. In some embodiments, it may be critical that the contact period is less than 1 day to increase ROS response based on the absorption of the ROS inducer.

In some embodiments, the contact period may be based on the type of ROS inducer used. For example, the contact period for an extract from the black walnut plant may be indefinite. Put another way, a black walnut extract may be applied to the soil and still provide the ROS response-inducing effects after multiple days before being absorbed by the root of the plant, such as greater than 10 days. In some examples, the contact period for hydrogen peroxide may be 24 hours or less. Hydrogen peroxide, when in the presence of sunlight and/or other elements, may break down into water and oxygen. This may result in hydrogen peroxide having a contact period less than that of a black walnut extract.

The periods mentioned above for contacting plant roots with the compositions of the present disclosure are intended to describe periods effective to cause an increase in nitrogen uptake and utilization efficiency and/or maintenance of plant biomass and/or an increase in plant quality. In some embodiments, the compositions of the invention are not deleterious to the plants and can be left in place after the desired period has elapsed.

The compositions may be applied to the soil by being run through a hose, pipe, drip, sprinkler, irrigation channel, or other mechanism. In practice, agriculture is not an exact science and the devices used are typically not precision equipment. Accordingly, when the water flow is turned off water will typically continue to drip or run from the hose or through the irrigation channel or other applicator for some time. It is therefore understood that the times of application will generally be an approximation and will be measured from the start of the flow of the mixture to when the flow of the mixture is turned off, whether or not some of the mixture continues to drip or run from the applicator.

The compositions of the present disclosure may be applied to the foliage of a plant. For example, the compositions of the present disclosure may be mixed in a spray tank and sprayed on a plant. The spray tank may be configured such that droplets of the ROS inducer remain on the leaves of the plant. This may allow the leaves of the plant to absorb and/or react to the presence of the ROS inducer, thereby increasing the ROS levels in the plant and/or inducing an increased ROS response in the plant.

Persons of skill are aware that non-chemical methods, such as crop rotation and cover crops, are used instead of or in conjunction with chemical methods to control nitrogen uptake and utilization efficiency. The compositions of the invention can be used in conjunction or in place of with these methods.

The embodiments of the present disclosure may be used to improve nitrogen uptake efficiency, nitrogen utilization efficiency, and/or improve plant biomass and plant quality in almost any plant. Although some plants are considered to be susceptible to damage due to raised ROS levels, the concentration of the ROS inducer when the compositions of the invention are applied at the concentration contemplated herein that even susceptible plants will not be damaged. The plants to be protected by means of the invention can be, among others, dicotyledons, such as carrots, lettuce, tomatoes, grapes, citrus fruits, and beans, or monocotyledons, such as corn. The plants can be grown for human or animal consumption, such as grains, vegetables, and fruits. The plants grown can be intended for decorative use, such as flowers, or can be intended for ornamental use, such as trees grown for use as Christmas trees or plants intended for use as house plants. Further, they can be plants grown for fiber, such as cotton plants, or for use as turf. The embodiments of the present disclosure may be used to protect plants grown in fields as crops or in other open conditions, such as tree farms or turf, the invention can, however, also be used to protect plants grown in settings such as greenhouses and hothouses. The compositions may also be used in hydroponic applications.

EXPERIMENTAL RESULTS

The experimental results described herein are the result of various empirical studies on the impact of the black walnut extract on nitrogen application. The experiments described below provide a baseline 100% nitrogen application rate. This baseline 100% nitrogen application rate is based on the conventional nitrogen application, as advised by local soil labs, the appropriate university extensions and commercial groups, for a particular crop, region, and soil condition. Indeed, in situations where a range of nitrogen application rates was available, the low end of the range was utilized for comparison. As discussed herein, the conventional and current thinking in agriculture is that the 100% nitrogen application rates maximize crop yield, with any reduction in nitrogen application typically associated with a reduction in crop yield.

Experiment 1

A third-party field trial was conducted on celery, comparing the effects of a Black Walnut Extract including salicylic acid applied alongside a CAN-17 nitrogen fertilizer compared to the nitrogen fertilizer alone. The experiments were conducted on test fields having a plot area of 40 square feet. The treatments were applied five times across a 15-week growing season. 10% of the treatments were applied at week 4, 15% of the treatments were applied at week 7, 20% of the treatments were applied at week 9, 25% of the treatments were applied at week 11, and 30% of the treatments were applied at week 13, and the crop was harvested at approximately week 15.

The nitrogen fertilizer was applied at a rate of approximately 100:1 with respect to the black walnut extract. As may be seen in Table 1, below, the full application rate of the nitrogen fertilizer was 80 gallons per season, with an associated 0.8 gallons per season of the black walnut extract.

TABLE 1

Application Rates

| | Application Rate | Application Amount |
|---|---|---|
| Nitrogen Fertilizer | 100% | 80 gal/season |
| Nitrogen Fertilizer | 50% | 40 gal/season |
| Nitrogen Fertilizer | 100% | 80 gal/season |
| Black Walnut Extract | | 0.8 gal/season |
| Nitrogen Fertilizer | 50% | 40 gal/season |
| Black Walnut Extract | | 0.4 gal/season |

Various plant metrics were measured to determine the effect of the black walnut extract on plant biomass. For example, as may be seen in Table 2, below, harvest weight was measured as an indicator of plant biomass.

TABLE 2

Plant Harvest Weight

| | Application Rate | Harvest Weight |
|---|---|---|
| Nitrogen Fertilizer | 100% | 1227 |
| Nitrogen Fertilizer | 50% | 1007 |
| Nitrogen Fertilizer Black Walnut Extract | 100% | 1329 |
| Nitrogen Fertilizer Black Walnut Extract | 50% | 1381 |

As may be seen in Table 2, the application of the black walnut extract and the nitrogen fertilizer resulted in increased harvest weight. For example, the 100% application of the nitrogen fertilizer and the black walnut extract resulted in an 8% increase in harvest weight with respect to the 100% nitrogen fertilizer application (e.g., (1329−1227)/1227). The 50% application of the black walnut extract and the nitrogen fertilizer resulted in a 37% increase in harvest weight with respect to the 50% nitrogen fertilizer application (e.g., (1381−1007)/1007). These results indicate that applying the black walnut extract with the nitrogen fertilizer results in an increase in plant quality, and more particularly an increase in harvest weight.

As may be seen, reducing the application rate of nitrogen fertilizer alone results in a decrease in harvest weight. For example, as may be seen in Table 2, reducing the amount of nitrogen fertilizer from the 100% application rate to the 50% application rate resulted in a decreased harvest weight. Surprisingly, the 50% application of the black walnut extract and the nitrogen fertilizer resulted in an increase of 13% in harvest weight with respect to the 100% nitrogen fertilizer application (e.g., (1381−1227)/1227). These results indicate that applying the black walnut extract causes an increased harvest weight, even when associated with a decrease in nitrogen fertilizer application. Indeed, reducing the application rate of the black walnut extract and the nitrogen fertilizer surprisingly increased harvest weight. Reducing the application rate of the black walnut extract and the nitrogen fertilizer from the 100% application rate to the 50% application rate resulted in a 4% increase in harvest weight.

These surprising results indicate that there is a synergistic relationship between the nitrogen fertilizer and the black walnut extract. While the exact mechanism remains unknown, and without being bound by theory, it is believed that application of the black walnut extract in association with the nitrogen fertilizer increases the uptake efficiency of nitrogen to the plant and increased nitrogen utilization efficiency in the plant or crop. As discussed herein, it is believed that the application of the black walnut extract may increase the ROS levels in a plant or a crop. This may induce a nitrogen-starved state in the plant. This may result in an increased nitrogen uptake efficiency and nitrogen utilization efficiency. Both increased nitrogen uptake efficiency and nitrogen utilization efficiency is associated with an increased harvest weight.

Indeed, these surprising results indicate that the harvest weight is increased (or, at the very least, maintained) with a reduction in the application rate of the nitrogen fertilizer and the black walnut extract. The harvest weight is increased both in comparison to the nitrogen fertilizer alone as well as an increase in the nitrogen fertilizer and black walnut combination.

As may be seen in Table 3, below, the 50% application nitrogen fertilizer and black walnut extract resulted in a 19.7% increase in nitrogen concentration (e.g., % N) with respect to the 50% nitrogen fertilizer alone (e.g., (2.13-1.78)/1.78). The nitrogen concentration may be the amount of nitrogen in a plant based on the dry matter of the plant. These results surprisingly indicate that the black walnut extract increases nitrogen uptake and utilization efficiency with a lower nitrogen fertilizer application. In contrast, reducing the nitrogen fertilizer without the black walnut extract resulted in a significantly reduced nitrogen concentration.

TABLE 3

Nitrogen Concentration

| | Application Rate | % N |
|---|---|---|
| Nitrogen Fertilizer | 100% | 2.26% |
| Nitrogen Fertilizer | 50% | 1.78% |
| Nitrogen Fertilizer Black Walnut Extract | 100% | 2.16% |
| Nitrogen Fertilizer Black Walnut Extract | 50% | 2.13% |

The experimental results further show an increase and/or a maintenance in other plant quality metrics, such as SPAD, vigor, and canopy, as may be seen below in Table 4.

TABLE 4

Plant Quality Metrics

| | Application Rate | SPAD | Vigor | Canopy |
|---|---|---|---|---|
| Nitrogen Fertilizer | 100% | 60.6 | 4.8 | 35.2 |
| Nitrogen Fertilizer | 50% | 65.2 | 5.0 | 37.5 |
| Nitrogen Fertilizer Black Walnut Extract | 100% | 65 | 4.8 | 35.8 |
| Nitrogen Fertilizer Black Walnut Extract | 50% | 63.8 | 5.0 | 34.7 |

As may be seen, applying the 100% nitrogen fertilizer and black walnut composition resulted in a 7% (e.g., (65-60.6)/60.6) increase in SPAD, maintained the vigor levels, and a 2% increase in canopy compared to the 100% nitrogen fertilizer alone. Applying the 100% nitrogen fertilizer and black walnut composition resulted in a 5% increase in SPAD, a 4% increase in vigor, and a 1% decrease in canopy. These surprising results indicate that the nitrogen fertilizer and black walnut composition results in an increase or a maintenance in plant quality metrics such as SPAD, vigor, and canopy. In combination with the increased harvest weight or plant biomass, the experimental results surprisingly indicate that application of the nitrogen fertilizer and black walnut extract composition results in a wholistic increase in plant quality when compared to nitrogen fertilizer alone. Indeed, the experimental results surprisingly indicate that application of a smaller amount or application rate of the nitrogen fertilizer and black walnut extract composition results in a wholistic increase in plant quality when compared to nitrogen fertilizer alone.

In accordance with at least one embodiment of the present disclosure, applying the black walnut extract in combination with the nitrogen fertilizer may allow a farm operator to reduce the amount of nitrogen fertilizer used on a particular field or for a particular crop. This may result in less nitrogen runoff from nitrogen fertilizer applied to a field. This may help to prevent damage to fields, waterways, lakes, oceans, and other areas due to high nitrogen concentrations resulting from nitrogen runoff. In some embodiments, reduced nitrogen fertilizer may result in reduced nitrogen gasses (e.g., NOx gasses) in the atmosphere. This may help to reduce the amount of pollution in the atmosphere associated with nitrogen fertilizers.

Experiment 2

A greenhouse trial was conducted on corn, comparing the effects of a Black Walnut Extract including salicylic acid applied alongside a CAN-17 nitrogen fertilizer compared to the nitrogen fertilizer alone. The experiments were conducted in a greenhouse on test pots having a pot diameter of 14 in. and filled with a low nitrogen soil.

The black walnut extract was applied at a rate of approximately 0.18 gallons per acre. As may be seen in Table 5 below, the full application rate of the nitrogen fertilizer was 16.3 gallons per acre, and 70% application rate and 50% application rate of nitrogen fertilizer was analyzed alongside the same application rate of the black walnut extract (BWE).

TABLE 5

Application Rates

| | Application Rate | Application Amount (gal per acre) |
|---|---|---|
| CAN-17 (100%) | 100% | 16.3 |
| CAN-17 (100%) | 100% | 16.3 |
| Black Walnut Extract | 100% | 0.18 |
| CAN-17 (70%) | 70% | 11.41 |
| CAN-17 (70%) | 70% | 11.41 |
| Black Walnut Extract | 100% | 0.18 |
| CAN-17 (50%) | 50% | 8.15 |
| CAN-17 (50%) | 50% | 8.15 |
| Black Walnut Extract | 100% | 0.18 |

Various plant metrics were measured to determine the effect of the black walnut extract on plant biomass and quality. For example, as may be seen in Table 6, below, above ground and below ground plant biomass was measured as an indicator of plant biomass.

TABLE 6

Plant Biomass

| | | Above Ground Biomass (wet) | Above Ground Biomass (dry) | Below Ground Biomass |
|---|---|---|---|---|
| 100% | CAN-17 | 46.80 | 14.83 | 10.07 |
| | CAN-17 + BWE | 58.31 | 16.38 | 12.16 |
| 70% | CAN-17 | 57.71 | 16.43 | 11.57 |
| | CAN-17 + BWE | 64.17 | 17.57 | 13.69 |
| 50% | CAN-17 | 54.74 | 16.08 | 11.68 |
| | CAN-17 + BWE | 61.33 | 16.97 | 12.36 |

As may be seen in Table 6, adding the black walnut extract increased plant biomass in every case studied. For example, adding the black walnut extract with a 100% CAN-17 nitrogen fertilizer resulted in a 24.5% increase in above ground wet biomass (e.g., (58.31−46.8)/46.8), a 10.5% increase in above ground dry biomass (e.g., (16.38−14.83)/14.83), and a 20.8% increase in below ground biomass (e.g., (12.16−10.07)/10.07). Adding the black walnut extract with a 70% CAN-17 nitrogen fertilizer resulted in an 11.2% increase in above ground wet biomass (e.g., (64.17−57.71)/57.71), a 7% increase in above ground dry biomass (e.g., (17.57−16.43)/16.43), and an 18.3% increase in below ground biomass (e.g., (13.69−11.57)/11.57). Adding the black walnut extract with a 50% CAN-17 nitrogen fertilizer resulted in a 12.0% increase in above ground wet biomass (e.g., (61.33−54.74)/54.74), a 5.6% increase in above ground dry biomass (e.g., (16.97−16.08)/16.08), and a 5.8% increase in below ground biomass (e.g., (12.36−11.68)/11.68).

Surprisingly, adding the black walnut extract to the 50% CAN-17 nitrogen fertilizer resulted in a 31.1% increase in above ground wet biomass with respect to the 100% CAN-17 nitrogen fertilizer application alone (e.g., (61.33−46.80)/46.80), a 14.4% increase in above ground dry biomass with respect to the 100% CAN-17 nitrogen fertilizer application alone (e.g., (16.97−14.83)/14.83), and a 22.7% increase in below ground biomass with respect to the 100% CAN-17 nitrogen fertilizer alone (e.g., (12.36−10.07)/10.07). These surprising results indicate that adding the black walnut extract results in an increased biomass with a reduced nitrogen fertilizer application.

Experiment 3

A greenhouse trial was conducted on corn, comparing the effects of a Black Walnut Extract including salicylic acid applied alongside a UAN-32 nitrogen fertilizer compared to the nitrogen fertilizer alone. The experiments were conducted on test pots filled with a high nitrogen soil.

The black walnut extract was applied at a rate of approximately 0.25 gallons per acre. As may be seen in Table 7 below, the full application rate of the nitrogen fertilizer was 8.5 gallons per acre, and 70% application rate and 50% application rate of nitrogen fertilizer was analyzed alongside the same application rate of the black walnut extract (BWE).

TABLE 7

Application Rates

|  | Application Rate | Application Amount (gal per acre) |
|---|---|---|
| UAN-32 (100%) | 100% | 8.5 |
| UAN-32 (100%) | 100% | 8.5 |
| Black Walnut Extract | 100% | 0.25 |
| UAN-32 (80%) | 80% | 6.8 |
| UAN-32 (80%) | 80% | 6.8 |
| Black Walnut Extract | 100% | 0.25 |
| UAN-32 (50%) | 50% | 4.25 |
| UAN-32 (50%) | 50% | 4.25 |
| Black Walnut Extract | 100% | 0.25 |

Various plant metrics were measured to determine the effect of the black walnut extract on plant biomass and quality. For example, as may be seen in Table 8, below, above and below ground plant biomass was measured as an indicator of plant biomass.

TABLE 8

Plant Biomass

|  |  | Above Ground Biomass | Below Ground Biomass |
|---|---|---|---|
| 100% | UAN-32 (100%) | 19.50 | 2.57 |
|  | UAN-32 (100%) + BWE | 22.14 | 4.86 |
| 80% | UAN-32 (80%) | 18.43 | 4.29 |
|  | UAN-32 (80%) + BWE | 22.00 | 5.25 |
| 50% | UAN-32 (50%) | 23.00 | 4.92 |
|  | UAN-32 (50%) + BWE | 25.71 | 5.00 |

As may be seen in Table 8, adding the black walnut extract increased plant biomass in every case studied. For example, adding the black walnut extract with a 100% UAN-32 nitrogen fertilizer resulted in a 13.6% increase in above ground biomass (e.g., (22.14−19.50)/19.50) and an 88.9% increase in below ground biomass (e.g., (4.86−2.57)/2.57). Adding the black walnut extract with an 80% UAN-32 nitrogen fertilizer resulted in a 19.4% increase in above ground biomass (e.g., (22.00−18.43)/18.43) and a 22.5% increase in below ground biomass (e.g., (5.25−4.25)/4.29). Adding the black walnut extract with a 50% UAN-32 nitrogen fertilizer resulted in an 11.8% increase in above ground biomass (e.g., (25.71−23.00)/23.00) and a 1.7% increase in below ground biomass (e.g., (5.00−4.92)/4.92). These surprising results indicate that adding the black walnut extract may result in an increase in plant biomass when associated with an applied nitrogen fertilizer.

Surprisingly, adding the black walnut extract to the 50% UAN-32 nitrogen fertilizer resulted in a 31.9% increase in above ground biomass with respect to the 100% UAN-32 nitrogen fertilizer application alone (e.g., (25.71−19.50)/19.50) and a 94.4% increase in below ground biomass with respect to the 100% UAN-32 nitrogen fertilizer alone (e.g., (5.00−2.57)/2.57). These surprising results indicate that adding the black walnut extract results in an increased biomass with a reduced nitrogen fertilizer application.

Experiment 4

A field trial was conducted on corn, comparing the effects of a black walnut extract including salicylic acid applied alongside a UAN-32 nitrogen fertilizer compared to the nitrogen fertilizer alone. The experiments were conducted on test pots having a pot area of 90.75 sq. in.

The nitrogen fertilizer and the black walnut extract were applied, in combination with a 0-10-10 fertilizer, at the rates below in Table 9. As may be seen in Table 9, below, the black walnut extract and the 0-10-10 application rate remained constant across the trials.

TABLE 9

Application Rates

|  | Application Rate | Application Amount |
|---|---|---|
| Nitrogen Fertilizer | 100% | 7.07 gal/acre |
| 0-10-10 Fertilizer | 100% | 24 gal/acre |
| Nitrogen Fertilizer | 70% | 4.94 gal/acre |
| 0-10-10 Fertilizer | 100% | 24 gal/acre |
| Black Walnut Extract | 100% | 0.25 gal/acre |
| Nitrogen Fertilizer | 50% | 3.535 gal/acre |
| Nitrogen Fertilizer | 50% | 3.535 gal/acre |
| 0-10-10 Fertilizer | 100% | 24 gal/acre |
| Black Walnut Extract | 100% | 0.25 gal/acre |

Various plant metrics were measured to determine the effect of the black walnut extract on plant biomass and quality. For example, as may be seen in Table 10, below, ear yield and silage yield were measured as an indicator of plant biomass. An untreated plot (e.g., no fertilizer or black walnut extract application) was also analyzed for comparison.

TABLE 10

Plant Yields

| | Application Rate | Ear Yield | Silage Yield |
|---|---|---|---|
| Untreated | N/A | 181.2 | 63.3 |
| Nitrogen Fertilizer | 100% | 176.4 | 57.0 |
| 0-10-10 Fertilizer | 100% | | |
| Nitrogen Fertilizer | 70% | 188.6 | 59.5 |
| 0-10-10 Fertilizer | 100% | | |
| Black Walnut Extract | 100% | | |
| Nitrogen Fertilizer | 50% | 167.9 | 54.2 |
| Nitrogen Fertilizer | 50% | 179.8 | 57.8 |
| 0-10-10 Fertilizer | 100% | | |
| Black Walnut Extract | 100% | | |

As may be seen in Table 10, the application of the black walnut extract and the nitrogen fertilizer resulted in increased yields with a reduced nitrogen application. For example, the 70% application of the nitrogen fertilizer and the black walnut extract resulted in a 6.9% increase in ear yield with respect to the 100% nitrogen fertilizer application (e.g., (188.6−176.4)/176.4). The 50% application of the nitrogen fertilizer and the black walnut extract resulted in a 1.9% increase in ear yield with respect to the 100% nitrogen fertilizer application (e.g., (179.8−176.4)/176.4) and a 7.1% increase in ear yield with respect to the 50% nitrogen fertilizer application (e.g., (179.8−167.9)/167.9). The 70% application of the nitrogen fertilizer and the black walnut extract resulted in a 4.4% increase in silage yield with respect to the 100% nitrogen fertilizer application (e.g., (59.5−57.0)/57.0). The 50% application of the nitrogen fertilizer and the black walnut extract resulted in a 1.3% increase in silage yield with respect to the 100% nitrogen fertilizer application (e.g., (57.8−57.0)/57.0) and a 6.7% increase in silage yield with respect to the 50% nitrogen fertilizer application (e.g., (57.8−54.2)/54.2). These results indicate that applying the black walnut extract with the nitrogen fertilizer results in an increase in plant quality, and more particularly an increase in ear and silage yields in corn.

Experiment 5

A field trial was conducted on corn, comparing the effects of a black walnut extract including salicylic acid applied alongside a UAN-32 nitrogen fertilizer compared to the nitrogen fertilizer alone. The experiments were conducted on test pots having a pot area of 90.75 sq. in.

The nitrogen fertilizer and the black walnut extract were applied at the rates below in Table 11.

TABLE 11

Application Rates

| | Application Rate | Application Amount |
|---|---|---|
| Nitrogen Fertilizer | 100% | 25 lb N/acre |
| Nitrogen Fertilizer | 50% | 12.5 lb N/acre |
| Black Walnut Extract | 100% | 0.25 gal/acre |
| Nitrogen Fertilizer | 25% | 6.25 lb N/acre |
| Black Walnut Extract | 100% | 0.25 gal/acre |
| Nitrogen Fertilizer | 25% | 6.25 lb N/acre |
| Black Walnut Extract | 200% | 0.50 gal/acre |

Various plant metrics were measured to determine the effect of the black walnut extract on plant biomass and quality. For example, as may be seen in Table 12, below, ear yield and the silage yield were measured as an indicator of plant quality. An untreated plot (e.g., no fertilizer or black walnut extract application) was also analyzed for comparison.

TABLE 12

Plant Yields

| | Application Rate | Corn Ear Yield | Corn Silage Yield |
|---|---|---|---|
| Untreated | N/A | 183.9 | 53.5 |
| Nitrogen Fertilizer | 100% | 188.0 | 55.3 |
| Nitrogen Fertilizer | 50% | 189.4 | 60.3 |
| Black Walnut Extract | 100% | | |
| Nitrogen Fertilizer | 25% | 189.5 | 57.4 |
| Black Walnut Extract | 100% | | |
| Nitrogen Fertilizer | 25% | 188.8 | 52.5 |
| Black Walnut Extract | 200% | | |

As may be seen in Table 12, the application of the black walnut extract and the nitrogen fertilizer resulted in increased yields based on reduced nitrogen application. For example, the 50% application of the nitrogen fertilizer and 100% application of the black walnut extract resulted in a 0.8% increase in ear yield with respect to the 100% nitrogen fertilizer application (e.g., (189.4−188.0)/188.0). The 25% application of the nitrogen fertilizer and the 100% application of black walnut extract resulted in a 0.8% increase in ear yield with respect to the 100% nitrogen fertilizer application (e.g., (189.5−188.0)/188.0). The 25% application of the nitrogen fertilizer and the 200% application of black walnut extract resulted in a 0.4% increase in ear yield with respect to the 100% nitrogen fertilizer application (e.g., (188.8−188.0)/188.0). The 50% application of the nitrogen fertilizer and the 100% application of the black walnut extract resulted in a 9.0% increase in silage yield with respect to the 100% nitrogen fertilizer application (e.g., (60.3−55.3)/55.3). The 25% application of the nitrogen fertilizer and the 100% application of the black walnut extract resulted in a 3.7% increase in silage yield with respect to the 100% nitrogen fertilizer application (e.g., (57.4−55.3)/55.3). These results indicate that applying the black walnut extract with the nitrogen fertilizer results in an increase in plant quality, and more particularly an increase in ear and silage yields in corn.

Experiment 6

A greenhouse trial was conducted on tomatoes, comparing the effects of a black walnut extract including salicylic acid applied alongside a UAN-32 nitrogen fertilizer compared to the nitrogen fertilizer alone. The experiments were conducted on test pots having a pot area of 4 sq. ft.

The nitrogen fertilizer and the black walnut extract were applied at the rates below in Table 13.

TABLE 13

Application Rates

| | Application Rate | Application Amount |
|---|---|---|
| Nitrogen Fertilizer | 100% | 21.2 gal/acre |
| Nitrogen Fertilizer | 100% | 21.2 gal/acre |
| Black Walnut Extract | 100% | 0.25 gal/acre |
| Nitrogen Fertilizer | 70% | 14.84 gal/acre |
| Nitrogen Fertilizer | 70% | 14.84 gal/acre |
| Black Walnut Extract | 100% | 0.25 gal/acre |
| Nitrogen Fertilizer | 50% | 10.6 gal/acre |
| Nitrogen Fertilizer | 50% | 10.6 gal/acre |
| Black Walnut Extract | 100% | 0.25 gal/acre |

Various plant metrics were measured to determine the effect of the black walnut extract on plant biomass and quality. For example, as may be seen in Table 14, below, biomass, above ground and below ground, was measured as an indicator of plant quality. An untreated plot (e.g., no fertilizer or black walnut extract application) was also analyzed for comparison.

TABLE 14

Plant Biomass

| | Application Rate | Biomass - Above Ground | Biomass - Below Ground |
|---|---|---|---|
| Untreated | N/A | 252.0 | 10.0 |
| Nitrogen Fertilizer | 100% | 321.7 | 19.2 |
| Nitrogen Fertilizer | 100% | 341.3 | 20.9 |
| Black Walnut Extract | 100% | | |
| Nitrogen Fertilizer | 70% | 331.3 | 16.2 |
| Nitrogen Fertilizer | 70% | 337.0 | 21.9 |
| Black Walnut Extract | 100% | | |
| Nitrogen Fertilizer | 50% | 332.4 | 18.6 |
| Nitrogen Fertilizer | 50% | 349.3 | 19.3 |
| Black Walnut Extract | 100% | | |

As may be seen in Table 14, the application of the black walnut extract and the nitrogen fertilizer resulted in increased biomass based on reduced nitrogen fertilizer. For example, the 100% application of the nitrogen fertilizer and the black walnut extract resulted in a 6.1% increase in above ground biomass with respect to the 100% nitrogen fertilizer application (e.g., (341.3−321.7)/321.7). The 70% application of the nitrogen fertilizer resulted and the black walnut extract in a 4.8% increase in above ground biomass with respect to the 100% nitrogen fertilizer application (e.g., (337.0−321.7)/321.7) and a 1.7% increase in above ground biomass with respect to the 70% nitrogen fertilizer application (e.g., (337.0−331.3)/331.3). The 50% application of the nitrogen fertilizer and the black walnut extract resulted in an 8.6% increase in above ground biomass with respect to the 100% nitrogen fertilizer application (e.g., (349.3−321.1)/349.3) and a 5.1% increase in above ground biomass with respect to the 50% nitrogen fertilizer application (e.g., (349.3−332.4)/332.4). The 100% application of the nitrogen fertilizer and the black walnut extract resulted in an 8.6% increase in below ground biomass with respect to the 100% of the nitrogen fertilizer application (e.g., (20.9−19.2)/19.2). The 70% application of the nitrogen fertilizer and the black walnut extract resulted in a 14.1% increase in below ground biomass with respect to the 100% nitrogen fertilizer application (e.g., (21.9−19.2)/19.2) and a 35.6% increase in below ground biomass with respect to the 70% nitrogen fertilizer application (e.g., (21.9−16.2)/16.2). The 50% application of the nitrogen fertilizer and the black walnut extract resulted in a 0.3% increase in below ground biomass with respect to the 100% nitrogen fertilizer application (e.g., (19.3−19.2)/19.2) and a 3.3% increase in below ground biomass with respect to the 50% application of nitrogen fertilizer application (e.g., (19.3−18.6)/18.6). These results indicate that applying the black walnut extract with the nitrogen fertilizer results in an increase in plant quality, and more particularly an increase in plant biomass.

Experiment 7

A greenhouse trial was conducted on tomatoes, comparing the effects of a Black Walnut Extract including salicylic acid applied alongside a UAN-32 nitrogen fertilizer compared to the nitrogen fertilizer alone. The experiments were conducted on test pots having a pot area of 4 sq. ft.

The nitrogen fertilizer and the black walnut extract were applied at the rates below in Table 15.

TABLE 15

Application Rates

| | Application Rate | Application Amount |
|---|---|---|
| Nitrogen Fertilizer | 100% | 9.9 gal/acre |
| Nitrogen Fertilizer | 50% | 4.9 gal/acre |
| Black Walnut Extract | 100% | 0.25 gal/acre |
| Nitrogen Fertilizer | 50% | 4.9 gal/acre |
| Black Walnut Extract | 50% | 0.125 gal/acre |
| Nitrogen Fertilizer | 25% | 2.4 gal/acre |
| Nitrogen Fertilizer | 25% | 2.4 gal/acre |
| Black Walnut Extract | 100% | 0.25 gal/acre |
| Nitrogen Fertilizer | 25% | 2.4 gal/acre |
| Black Walnut Extract | 200% | 0.50 gal/acre |

Various plant metrics were measured to determine the effect of the black walnut extract on plant biomass and plant quality. For example, as may be seen in Table 16, below, biomass, above ground and below ground, was measured as an indicator of plant quality. An untreated plot (e.g., no fertilizer or black walnut extract application) was also analyzed for comparison.

TABLE 16

Plant Biomass

| | Application Rate | Biomass - Above Ground | Biomass - Below Ground |
|---|---|---|---|
| Untreated | N/A | 19.7 | 2.2 |
| Nitrogen Fertilizer | 100% | 113.9 | 7.9 |
| Nitrogen Fertilizer | 50% | 143.5 | 8.3 |
| Black Walnut Extract | 100% | | |
| Nitrogen Fertilizer | 50% | 142.1 | 7.6 |
| Black Walnut Extract | 50% | | |
| Nitrogen Fertilizer | 25% | 91.1 | 7.0 |
| Nitrogen Fertilizer | 25% | 90.5 | 7.7 |
| Black Walnut Extract | 100% | | |
| Nitrogen Fertilizer | 25% | 92.0 | 7.0 |
| Black Walnut Extract | 200% | | |

As may be seen in Table 16, the application of the black walnut extract and the nitrogen fertilizer resulted in increased biomass with reduced nitrogen fertilizer application. For example, the 50% application of the nitrogen fertilizer and the 100% application of the black walnut extract resulted in a 26.0% increase in above ground biomass with respect to the 100% nitrogen fertilizer application (e.g., (143.5−113.9)/113.9) and a 5.8% increase in below ground biomass (e.g., (8.3−7.9)/7.9). The 50% application of the black walnut extract and the nitrogen fertilizer resulted in a 24.8% increase in above ground biomass with respect to the 100% nitrogen fertilizer application (e.g., (142.1−113.9)/113.9). These results indicate that applying the black walnut extract with the nitrogen fertilizer results in an increase in plant quality, and more particularly an increase in plant biomass. These results further indicate the black walnut extract provides diminishing returns with a 25% nitrogen fertilizer application. Put another way, the 25% nitrogen fertilizer application rate resulted in reduced biomass compared to the 100% nitrogen fertilizer application rate.

Experiment 8

A greenhouse trial was conducted on corn, comparing the effects of a Black Walnut Extract including salicylic acid applied alongside a UAN-32 nitrogen fertilizer compared to the nitrogen fertilizer alone. The experiments were conducted on test pots having a pot area of 4 sq. ft.

The nitrogen fertilizer and the black walnut extract were applied at the rates below in Table 17.

TABLE 17

Application Rates

| | Application Rate | Application Amount |
|---|---|---|
| Nitrogen Fertilizer | 100% | 8.5 gal/acre |
| Nitrogen Fertilizer | 50% | 4.2 gal/acre |
| Black Walnut Extract | 100% | 0.25 gal/acre |
| Nitrogen Fertilizer | 50% | 4.2 gal/acre |
| Black Walnut Extract | 50% | 0.125 gal/acre |
| Nitrogen Fertilizer | 25% | 2.1 gal/acre |
| Nitrogen Fertilizer | 25% | 2.1 gal/acre |
| Black Walnut Extract | 100% | 0.25 gal/acre |
| Nitrogen Fertilizer | 50% | 2.1 gal/acre |
| Black Walnut Extract | 200% | 0.50 gal/acre |

Various plant metrics were measured to determine the effect of the black walnut extract on plant biomass and quality. For example, as may be seen in Table 18, below, biomass, above ground and below ground, was measured as an indicator of plant biomass. An untreated plot (e.g., no fertilizer or black walnut extract application) was also analyzed for comparison.

TABLE 18

Plant Biomass

| | Application Rate | Biomass - Above Ground | Biomass - Below Ground |
|---|---|---|---|
| Untreated | N/A | 8.25 | 12.2 |
| Nitrogen Fertilizer | 100% | 10.9 | 11.1 |
| Nitrogen Fertilizer | 50% | 18.3 | 12.4 |
| Black Walnut Extract | 100% | | |
| Nitrogen Fertilizer | 50% | 15.7 | 9.0 |
| Black Walnut Extract | 50% | | |
| Nitrogen Fertilizer | 25% | 14.6 | 14.9 |
| Nitrogen Fertilizer | 25% | 17.4 | 17.1 |
| Black Walnut Extract | 100% | | |
| Nitrogen Fertilizer | 25% | 24.5 | 23.5 |
| Black Walnut Extract | 200% | | |

As may be seen in Table 18, the application of the black walnut extract and the nitrogen fertilizer resulted in increased biomass with reduced nitrogen application. For example, the 50% application of the nitrogen fertilizer and 100% application of the black walnut extract resulted in a 68.1% increase in above ground biomass with respect to the 100% nitrogen fertilizer application (e.g., (18.3−10.9)/10.9). The 50% application of the nitrogen fertilizer and 50% black walnut extract resulted in a 44.1% increase in above ground biomass with respect to the 100% nitrogen fertilizer application (e.g., (15.7−10.9)/10.9). The 25% application of the nitrogen fertilizer and 100% black walnut extract resulted in a 60.3% increase in above ground biomass with respect to the 100% nitrogen fertilizer application (e.g., (17.4−10.9)/10.9) and a 19.6% increase in above ground biomass with respect the 25% nitrogen fertilizer application (e.g., (17.4−14.6)/14.6). The 25% application of the nitrogen fertilizer and the 200% black walnut extract resulted in a 125.3% increase in above ground biomass with respect to the 100% nitrogen fertilizer application (e.g., (24.5−10.9)/10.9) and a 68.1% increase in above ground biomass with respect to the 25% nitrogen fertilizer application (e.g., (24.5−14.6)/14.6). The 50% application of the nitrogen fertilizer and 100% application of the black walnut extract resulted in a 11.7% increase in below ground biomass with respect to the 100% nitrogen fertilizer application (e.g., (12.4−11.1)/11.1). The 25% application of the nitrogen fertilizer and 100% black walnut extract resulted in a 54.1% increase in below ground biomass with respect to the 100% nitrogen fertilizer application (e.g., (17.1−11.1)/11.1) and a 15.4% increase in below ground biomass with respect the 25% nitrogen fertilizer application (e.g., (17.1−14.9)/14.9). The 25% application of the nitrogen fertilizer and the 200% black walnut extract resulted in a 111.2% increase in below ground biomass with respect to the 100% nitrogen fertilizer application (e.g., (23.5−12.4)/12.4) and a 58.2% increase in below ground biomass with respect to the 25% nitrogen fertilizer application (e.g., (23.5−14.9)/14.9). These results indicate that applying the black walnut extract with the nitrogen fertilizer results in an increase in plant quality, and more particularly an increase in plant biomass.

Experiment 9

A field trial was conducted on corn, comparing the effects of a Black Walnut Extract including salicylic acid applied alongside a UAN-32 nitrogen fertilizer compared to the nitrogen fertilizer alone. The experiments were conducted on test plots having a plot area of 200 sq. ft.

The nitrogen fertilizer and the black walnut extract were applied at the rates below in Table 19.

TABLE 19

Application Rates

| | Application Rate | Application Amount |
|---|---|---|
| Nitrogen Fertilizer | 100% | 42 gal/acre |
| Nitrogen Fertilizer | 75% | 31.5 gal/acre |
| Black Walnut Extract | 100% | 54 fl. oz/acre |
| Nitrogen Fertilizer | 50% | 21 gal/acre |
| Nitrogen Fertilizer | 50% | 21 gal/acre |
| Black Walnut Extract | 50% | 27 fl. oz/acre |

Various plant metrics were measured to determine the effect of the black walnut extract on plant biomass and quality. For example, as may be seen in Table 20, below, fresh and dry silage, was measured as an indicator of plant biomass.

TABLE 20

Plant Weights

| | Application Rate | Fresh Silage Weight | Dry Silage Weight |
|---|---|---|---|
| Nitrogen Fertilizer | 100% | 311.5 | 132.25 |
| Nitrogen Fertilizer | 75% | 313.0 | 123.75 |
| Black Walnut Extract | 100% | | |
| Nitrogen Fertilizer | 50% | 304.75 | 131.5 |
| Nitrogen Fertilizer | 50% | 311.75 | 127.5 |
| Black Walnut Extract | 50% | | |

As may be seen in Table 20, the application of the black walnut extract and the nitrogen fertilizer resulted in increased silage weights. For example, the 75% application of the nitrogen fertilizer and 100% application of the black walnut extract resulted in a 0.5% increase in fresh plant weight with respect to the 100% nitrogen fertilizer application (e.g., (313.0−311.5)/313.0). The 50% application of the nitrogen fertilizer and 50% black walnut extract resulted in a 0.1% increase in fresh plant weight with respect to the 100% nitrogen fertilizer application (e.g., (313.0−311.5)/

311.5) and a 2.5% increase in fresh plant weight with respect to the 50% nitrogen fertilizer application (e.g., (311.75−304.75)/304.75). These results indicate that applying the black walnut extract with the nitrogen fertilizer results in an increase in plant quality, and more particularly an increase in plant biomass.

Experiment 10

A field trial was conducted on corn, comparing the effects of a Black Walnut Extract including salicylic acid applied alongside a UAN-32 nitrogen fertilizer compared to the nitrogen fertilizer alone. The experiments were conducted on test plots having a plot area of 200 sq. ft.

The nitrogen fertilizer and the black walnut extract were applied at the rates below in Table 21.

TABLE 21

Application Rates

| | Application Rate | Application Amount |
|---|---|---|
| Nitrogen Fertilizer | 100% | 42 gal/acre |
| Nitrogen Fertilizer | 75% | 31.5 gal/acre |
| Black Walnut Extract | 100% | 54 fl. oz/acre |
| Nitrogen Fertilizer | 50% | 21 gal/acre |
| Nitrogen Fertilizer | 50% | 21 gal/acre |
| Black Walnut Extract | 50% | 27 fl. oz/acre |

Various plant metrics were measured to determine the effect of the black walnut extract on plant biomass and quality. For example, as may be seen in Table 22, below, harvest weight of the corn ears, was measured as an indicator of plant biomass.

TABLE 22

Plant Weights

| | Application Rate | Fresh Silage Weight | Dry Silage Weight |
|---|---|---|---|
| Nitrogen Fertilizer | 100% | 311.5 | 132.25 |
| Nitrogen Fertilizer | 75% | 313.0 | 123.75 |
| Black Walnut Extract | 100% | | |
| Nitrogen Fertilizer | 50% | 304.75 | 131.5 |
| Nitrogen Fertilizer | 50% | 311.75 | 127.5 |
| Black Walnut Extract | 50% | | |

As may be seen in Table 20, the application of the black walnut extract and the nitrogen fertilizer resulted in increased silage weights. For example, the 75% application of the nitrogen fertilizer and 100% application of the black walnut extract resulted in a 2.8% increase in fresh plant weight with respect to the 100% nitrogen fertilizer application (e.g., (44.1−42.88)/42.88). The 50% application of the nitrogen fertilizer and 50% black walnut extract resulted in a 7.3% increase in fresh plant weight with respect to the 50% nitrogen fertilizer application (e.g., (54.53−53.53)/53.53). These results indicate that applying the black walnut extract with the nitrogen fertilizer results in an increase in plant quality, and more particularly an increase in plant biomass.

Experiment 11

A third-party field trial was conducted on cantaloupe melons, comparing the effects of a Black Walnut Extract including salicylic acid applied alongside two different nitrogen fertilizers (CAN17 and UAN-32) compared to the nitrogen fertilizer alone.

The nitrogen fertilizer and the black walnut extract were applied at the rates below in Table 23.

TABLE 23

Application Rates

| | Application Rate |
|---|---|
| Nitrogen Fertilizer UAN-32 | 100% |
| Nitrogen Fertilizer UAN-32 | 50% |
| Black Walnut Extract | 100% |
| Nitrogen Fertilizer CAN17 | 100% |
| Nitrogen Fertilizer CAN17 | 50% |
| Black Walnut Extract | 100% |

Various plant metrics were measured to determine the effect of the black walnut extract on plant biomass and quality. For example, as may be seen in Table 24, below, melon yield of the cantaloupe and brix levels of the cantaloupe were measured as indicators of plant biomass and quality.

TABLE 24

Plant Quality

| | Application Rate | Melon Yield | Brix |
|---|---|---|---|
| Nitrogen Fertilizer UAN-32 | 100% | 1.2 | 10.8 |
| Nitrogen Fertilizer UAN-32 | 50% | 1.25 | 11.7 |
| Black Walnut Extract | 100% | | |
| Nitrogen Fertilizer CAN17 | 100% | 1.25 | 10.6 |
| Nitrogen Fertilizer CAN17 | 50% | 1.28 | 11.8 |
| Black Walnut Extract | 100% | | |

As may be seen in Table 24, the application of the black walnut extract and the nitrogen fertilizer resulted in increased melon yield and brix. For example, the 50% application of the UAN-32 nitrogen fertilizer and 100% application of the black walnut extract resulted in a 4.2% increase in melon yield with respect to the 100% UAN nitrogen fertilizer application (e.g., (1.25−1.2)/1.2) and an 8.3% increase in brix (e.g., (11.7−10.8)/10.8). The 50% application of the nitrogen fertilizer and 100% black walnut extract resulted in a 2.4% increase in melon with respect to the CAN17 nitrogen fertilizer application (e.g., (1.28−1.25)/1.25) and 11.3% increase in brix (e.g., (11.8−10.6)/10.6). These results indicate that applying the black walnut extract with the nitrogen fertilizer, regardless of the nitrogen fertilizer type, results in an increase in plant quality, and more particularly an increase in melon yield and brix.

Experiment 12

A third-party field trial was conducted on celery, comparing the effects of a Black Walnut Extract including salicylic acid applied alongside two different nitrogen fertilizers (CAN17 and UAN-32) compared to the nitrogen fertilizer alone.

The nitrogen fertilizer and the black walnut extract were applied at the rates below in Table 25.

TABLE 25

Application Rates

| | Application Rate |
|---|---|
| Nitrogen Fertilizer UAN-32 | 100% |
| Nitrogen Fertilizer UAN-32 | 50% |
| Black Walnut Extract | 100% |
| Nitrogen Fertilizer CAN17 | 100% |
| Nitrogen Fertilizer CAN17 | 50% |
| Black Walnut Extract | 100% |

Various plant metrics were measured to determine the effect of the black walnut extract on plant biomass and quality. For example, as may be seen in Table 26, below, plant biomass was measured as an indicator of plant quality.

TABLE 26

Plant Quality

|  | Application Rate | Biomass | Standard Error of the Mean |
|---|---|---|---|
| Nitrogen Fertilizer UAN-32 | 100% | 0.735 | 0.215 |
| Nitrogen Fertilizer UAN-32 | 50% | 0.703 | 0.244 |
| Black Walnut Extract | 100% |  |  |
| Nitrogen Fertilizer CAN17 | 100% | 0.734 | 0.240 |
| Nitrogen Fertilizer CAN17 | 50% | 0.757 | 0.245 |
| Black Walnut Extract | 100% |  |  |

As may be seen in Table 26, the application of the black walnut extract and the nitrogen fertilizer resulted in increased biomass. For example, the 50% application of the nitrogen fertilizer and black walnut extract resulted in a 3.1% increase in biomass with respect to the CAN17 nitrogen fertilizer application (e.g., (0.757−0.734)/0.734). While numerically the 50% application rate of UAN-32 resulted in a lower biomass, the results are well within the standard error of the mean for both the 100% application rate of UAN-32 alone and the 50% application rate of UAN-32 combined with the black walnut extract. These results indicate that applying the black walnut extract with the nitrogen fertilizer, regardless of the nitrogen fertilizer type, results in an increase or maintenance in plant quality, and more particularly an increase or maintenance in biomass.

Experiment 13

A field trial was conducted on broccoli, comparing the effects of a Black Walnut Extract including salicylic acid applied alongside two different nitrogen fertilizers (CAN17 and UAN-32) compared to the nitrogen fertilizer alone.

The nitrogen fertilizer and the black walnut extract were applied at the rates below in Table 27.

TABLE 27

Application Rates

|  | Application Rate |
|---|---|
| Nitrogen Fertilizer UAN-32 | 100% |
| Nitrogen Fertilizer UAN-32 | 50% |
| Black Walnut Extract | 100% |
| Nitrogen Fertilizer CAN17 | 100% |
| Nitrogen Fertilizer CAN17 | 50% |
| Black Walnut Extract | 100% |

Various plant metrics were measured to determine the effect of the black walnut extract on plant biomass and quality. For example, as may be seen in Table 28, below, plant yield was measured as an indicator of plant biomass.

TABLE 28

Plant Quality

|  | Application Rate | Yield |
|---|---|---|
| Nitrogen Fertilizer UAN-32 | 100% | 82.5 |
| Nitrogen Fertilizer UAN-32 | 50% | 81.8 |
| Black Walnut Extract | 100% |  |
| Nitrogen Fertilizer CAN17 | 100% | 87.8 |
| Nitrogen Fertilizer CAN17 | 50% | 84.8 |
| Black Walnut Extract | 100% |  |

As may be seen in Table 28, the application of the black walnut extract and the nitrogen fertilizer resulted in maintained biomass. While numerically the results with decreased nitrogen fertilizer and the black walnut extract are smaller than the full fertilizer application, the difference is within the error of the trial. These results indicate that applying the black walnut extract with the nitrogen fertilizer, regardless of the nitrogen fertilizer type, results in a maintenance in plant yield with a reduction in nitrogen fertilizer.

Figure 2:
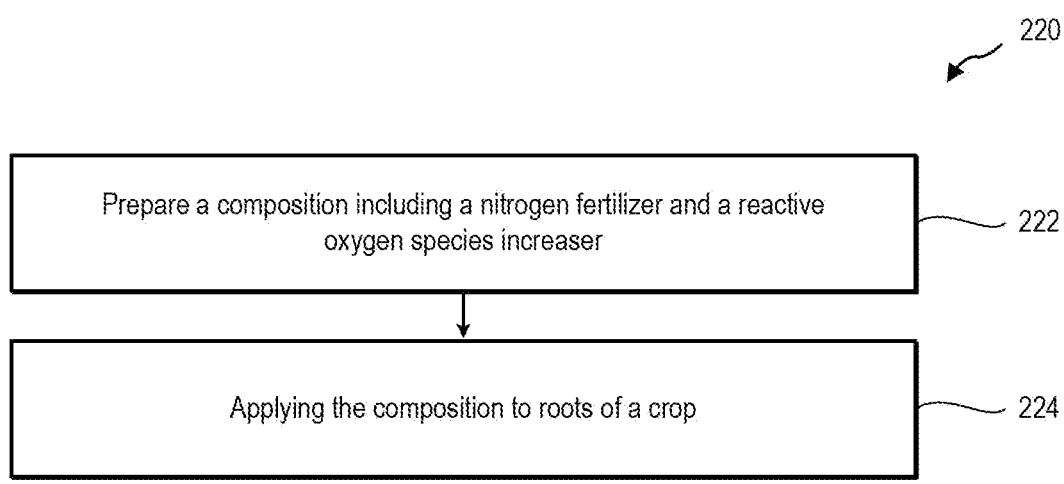
FIG. 2 is a flowchart of a method for increasing plant quality, according to at least one embodiment of the present disclosure.

FIG. 2 is a flowchart of a method 220 for increasing plant quality in a crop, according to at least one embodiment of the present disclosure. A farm operator may prepare a composition including a nitrogen fertilizer and a reactive oxygen species inducer at 222. The nitrogen fertilizer may include a CAN-17 fertilizer and the reactive oxygen species inducer may include a black walnut extract or any other ROS inducer discussed herein. In some embodiments, preparing the composition may include mixing the nitrogen fertilizer and the reactive oxygen species and reactive oxygen species inducer with a ratio of 100:1 by weight. The method 220 may further include applying the composition to roots of a crop at 224. The composition may be applied to the roots such that the roots absorb at least a portion of the nitrogen fertilizer and at least a portion of the reactive oxygen species and reactive oxygen species inducer. The reactive oxygen species and reactive oxygen species inducer may be configured to increase the ROS levels in the crop to improve the harvest weight of the crop. In some embodiments, the composition may be applied to the top 12 inches of soil.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A composition for maintaining improving plant biomass while reducing nitrogen fertilizer amount, the composition comprising:
   a first ingredient including a reactive oxygen species inducer, wherein an effective amount of the reactive oxygen species inducer includes a ratio between a nitrogen fertilizer and the reactive oxygen species inducer, wherein the effective amount is sufficient to increase a reactive oxygen species response of said plant and improve said plant biomass while reducing the nitrogen fertilizer amount with respect to said plant biomass, the increased reactive oxygen species response inducing increased nutrient uptake efficiency by said plant wherein the reactive oxygen species inducer includes an extract of a [1,4]naphthoquinone-producing plant, wherein the extract does not include 1,4-naphthoquinone or juglone; and
   a second ingredient including salicylic acid.

2. The composition of claim 1, wherein the extraction solution is an aqueous acid-alcohol solution having 30% to 70% alcohol and 30 to 70% acid.

3. The composition of claim 1, wherein the 1,4-naphthoquinone-producing plant is a member of the genus *Juglans*.

4. The composition of claim 3, wherein the naphthoquinone-producing plant is of a species *J. nigra*.

5. The composition of claim 1, wherein the reactive oxygen species inducer includes a naphthoquinone.

6. The composition of claim 1, further comprising soluble carbon.

7. The composition of claim 6, wherein the soluble carbon includes a leonardite extract.

8. The composition of claim 1, further comprising a surfactant.

9. The composition of claim 1, wherein the ratio is between 7 lb. nitrogen fertilizer per pint of reactive oxygen species inducer and 45 lb. nitrogen fertilizer per pint of reactive oxygen species inducer.

10. The composition of claim 1, further comprising at least one of menadione, lysine, isoleucine, or melatonin.

11. The composition of claim 10, further comprising a third ingredient including the lysine.

12. The composition of claim 11, further comprising:
    a fourth ingredient including menadione;
    a fifth ingredient including the isoleucine; and
    a sixth ingredient including the melatonin.

13. The composition of claim 9, wherein the reactive oxygen species inducer is applied with the ratio of approximately 27 lb. nitrogen fertilizer per pint of reactive oxygen species inducer.

14. The composition of claim 1, wherein the extract is produced by placing the naphthoquinone producing plant into an extraction solution, and the extract comprises the extraction solution into which the plant is placed.

15. The composition of claim 14, wherein the extraction solution is an aqueous acid-alcohol solution having up to 95.6% alcohol and up to 99% acid.

16. The composition of claim 14, wherein the extraction solution includes a combination of a first extraction solution of up to 95.6% alcohol and a second extraction solution of up to 99% acid.

* * * * *

UNITED STATES PATENT AND TRADEMARK OFFICE
CERTIFICATE OF CORRECTION

| | | |
|---|---|---|
| PATENT NO. | : 12,349,681 B2 | Page 1 of 1 |
| APPLICATION NO. | : 18/483463 | |
| DATED | : July 8, 2025 | |
| INVENTOR(S) | : Darin J. Moon and Kody Moon | |

It is certified that error appears in the above-identified patent and that said Letters Patent is hereby corrected as shown below:

In the Claims

In Column 33, Line 53, replace "1. A composition for maintaining improving plant bio-" with --1. A composition for improving plant bio- --.

In Column 34, Line 9, replace "inducer includes an extract of a [1,4]napthoquinone-" with --inducer includes an extract of a napthoquinone- --.

In Column 34, Line 16, replace "wherein the 1,4-napthoquinone-" with --wherein the napthoquinone- --.

Signed and Sealed this
Twenty-first Day of October, 2025

John A. Squires
*Director of the United States Patent and Trademark Office*